United States Patent [19]

Holmes et al.

[11] Patent Number: 4,598,380

[45] Date of Patent: Jul. 1, 1986

[54] METHOD AND APPARATUS FOR CONTROLLING MANIPULATOR AND WORKPIECE POSITIONER

[75] Inventors: John G. Holmes; Elena R. Messina; Brian J. Resnick; Charles C. Teach, all of Cincinnati, Ohio

[73] Assignee: Cincinnati Milacron Inc., Cincinnati, Ohio

[21] Appl. No.: 640,431

[22] Filed: Aug. 13, 1984

[51] Int. Cl.[4] ........................ G06F 15/46; G05B 19/42
[52] U.S. Cl. ..................................... 364/513; 364/474; 318/568; 901/20
[58] Field of Search ............... 364/169, 474, 475, 513, 364/702, 720, 853, 167, 171, 174, 191, 192, 193; 318/573, 568, 571; 901/20

[56] References Cited

U.S. PATENT DOCUMENTS

| | | | |
|---|---|---|---|
| 3,909,600 | 9/1975 | Hohn | 364/513 |
| 4,262,336 | 4/1981 | Pritchard | 364/474 |
| 4,453,221 | 6/1984 | Davis | 364/513 |
| 4,506,335 | 3/1985 | Magnuson | 364/513 |
| 4,538,233 | 8/1985 | Resnick et al. | 364/513 |

Primary Examiner—Jerry Smith
Assistant Examiner—Allen MacDonald
Attorney, Agent, or Firm—John W. Gregg

[57] ABSTRACT

A method and apparatus are provided for cooperatively controlling motion between a tool centerpoint associated with a function element carried by a manipulator and rotation of a workpiece carried by a positioner. The tool centerpoint follows a linear path interpolated between programmed locations at a velocity resulting in a relative velocity between the tool centerpoint and the workpiece surface equal to a programmed velocity. Differences in radial distance of the tool centerpoint from the axis of rotation of the workpiece at successive programmed locations result in incremental velocity modifications along the path to maintain the relative velocity at the programmed value.

27 Claims, 27 Drawing Figures

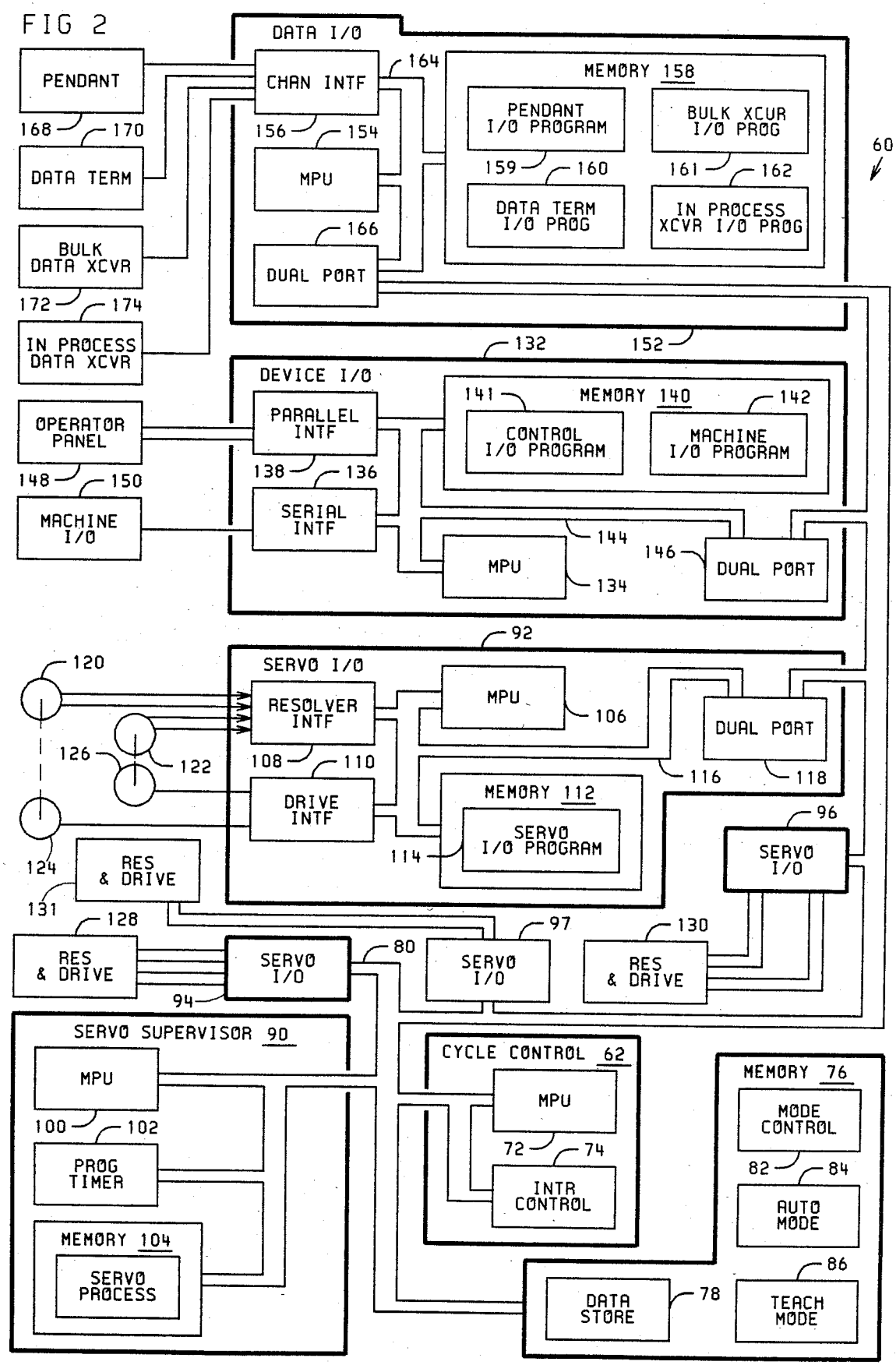

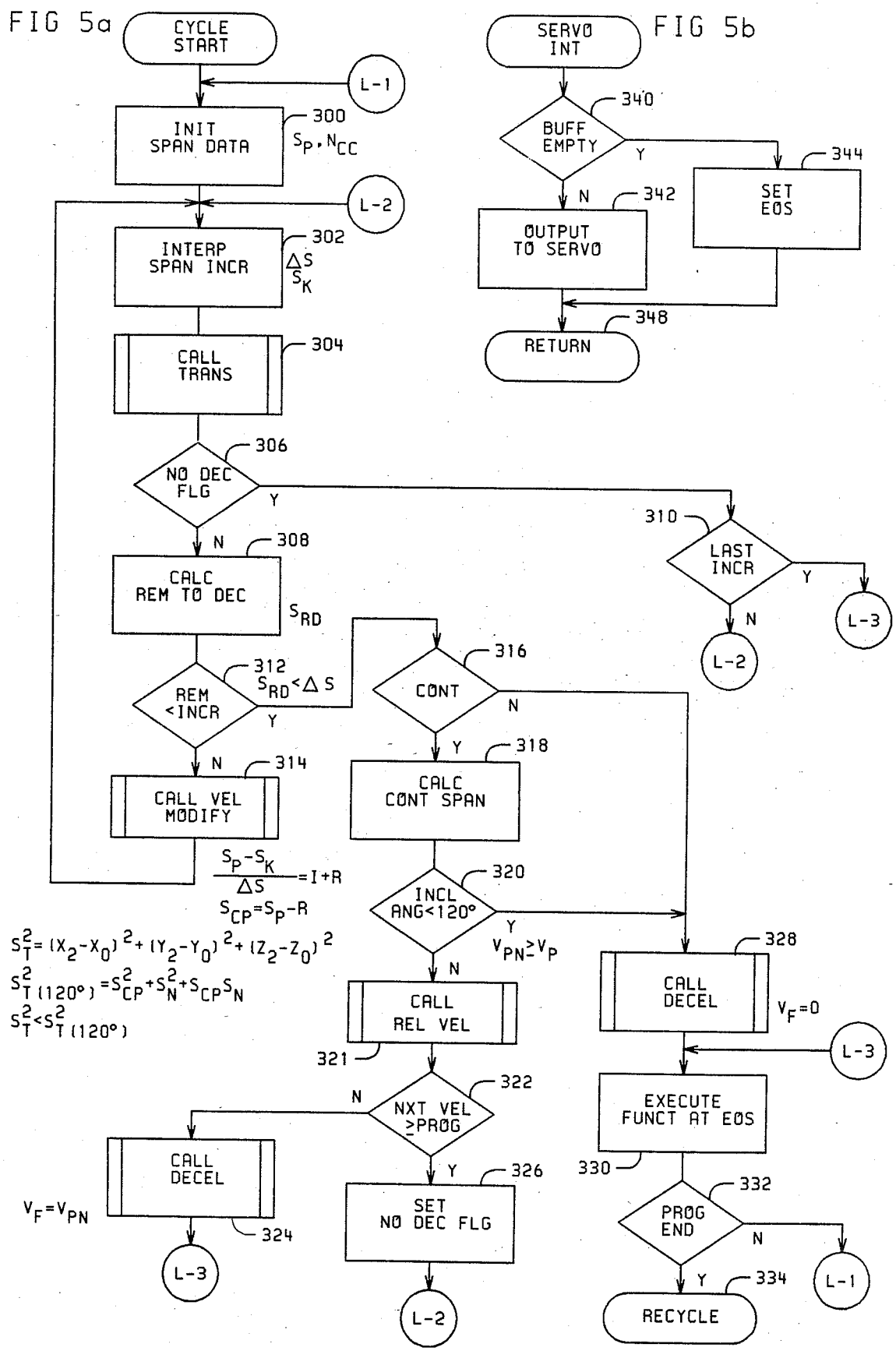

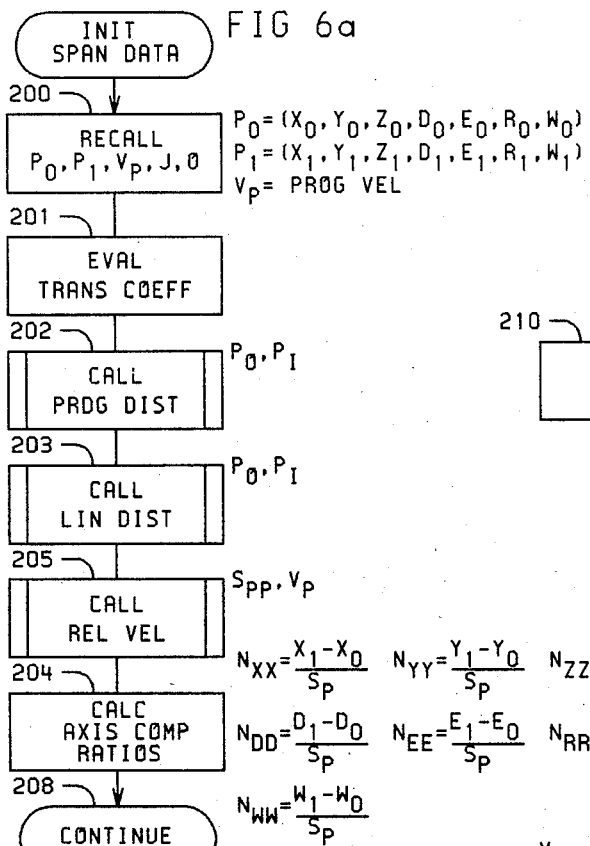
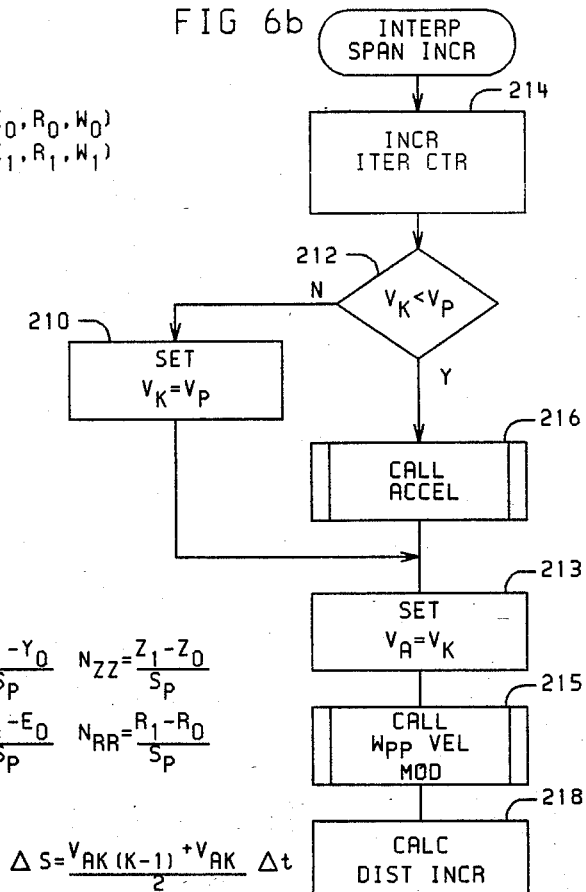
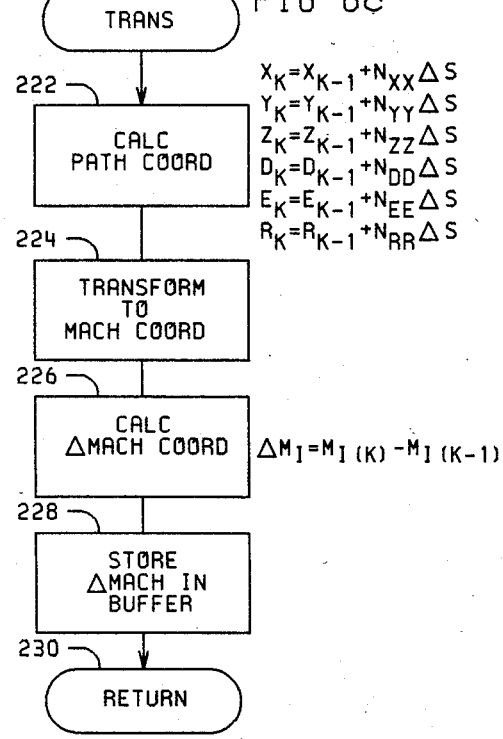
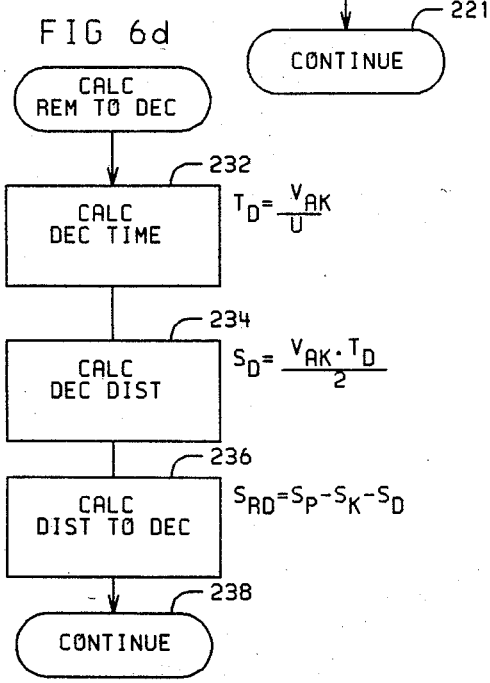

METHOD AND APPARATUS FOR CONTROLLING MANIPULATOR AND WORKPIECE POSITIONER

BACKGROUND OF THE INVENTION

This invention relates generally to machine control. In particular this invention relates to coordinated motion of a tool carried by a program controlled manipulator with motion of a workpiece carried by a program controlled positioner.

Some applications of program control manipulators require, in addition to the motion imparted to the tool carried by the manipulator, that the workpiece be rotated to provide continuous processing over surface segments which cannot simultaneously be presented in the most advantageous attitude. For example, where seam joining or sealing is involved, best results are achieved when gravity assists the deposition of material. However, where the seam traverses a contour on a curved plane or across multiple flat planes, it is not always possible to achieve a suitable relative orientation of workpiece and tool without rotating the workpiece. The coordination of tool motion and workpiece motion presents difficulties in program creation as the effective relative velocity of workpiece and tool may vary with position as the desired relative motions are executed. In some previously known control systems, all motions of the manipulator were affected if there was a simultaneous motion of the workpiece, even if the combined motions were not being executed to perform work on the workpiece. Thus, prepositioning moves from a rest or load location to a process start location would be affected by the motion coordinating algorithms.

Further, in previously known systems, program creation required that the programmer enter the effective path distance resulting from the combined motions. As manipulator programs have traditionally been created by a process of manually commanded positioning and data recording, the span length computation required for coordinated motion conflicts with the traditional program creation process.

It is, therefore, one object of the present invention to provide a manipulator control for coordinating motion of a manipulator with rotation of a workpiece in response to input signals defining the beginning and end points of motions of both the manipulator and the workpiece positioner and the relative velocity between a tool carried by the manipulator and the workpiece surface.

It is a further object of the present invention to provide a control for a program controlled manipulator for coordinating linear motions effected by the manipulator with workpiece rotations when these simultaneous motions are initiated within a predefined envelope describing proximity of a tool centerpoint to the workpiece positioner.

It is a still further object of the present invention to provide a control for a program controlled manipulator for coordinating the linear motion effected by the manipulator with workpiece rotation where the radius of the workpiece changes within the span length traversed by the tool centerpoint.

It is a still further object of the present invention to provide a control for a program controlled manipulator for coordinating the linear motion effected by the manipulator and workpiece rotation wherein the effective relative motion of the tool centerpoint to the workpiece surface includes a substantial tangential component.

Further objects and advantageous of the present invention shall become apparent from the appended drawings and the description thereof.

SUMMARY OF THE INVENTION

In accordance with the aforesaid objects, a control for a program controlled manipulator and workpiece positioner is provided for coordinating linear motion of a tool centerpoint of a function element carried by the manipulator and rotation of the workpiece effected by the workpiece positioner. Simultaneous linear motion of the tool centerpoint and workpiece rotation which are initiated such that the tool centerpoint is located within a predefined envelope relative to the workpiece mounting table are subject to velocity coordination. The control computes the effective linear distance using input signals representing the end points of the linear motion of the tool centerpoint and the rotation of the workpiece. The control accommodates programmed motions having a substantial tangential component. The effective linear distance is used to produce an adjusted velocity signal to effect relative velocity between the tool centerpoint and the workpiece surface at the programmed velocity. The control iteratively produces increments of tool centerpoint motion and workpiece rotation which are effected over an increment interval period. The relative velocity for each increment interval period is modified to accommodate changing workpiece surface velocity occurring as a result of motion of the tool center point relative to a workpiece portion having a varying radius.

BRIEF DESCRIPTION OF THE DRAWINGS

FIG. 2 is a block diagram of the control of FIG. 1.

FIGS. 5(a) and 5(b) are flow charts of the two principle control procedures effecting motion control.

FIGS. 6(a) through 6(f) are flow charts of subroutines and major segments of the flow chart of FIG. 5(a).

DESCRIPTION OF THE PREFERRED EMBODIMENT

For purposes of illustrating the present invention, a manipulator and control shown in the accompanying drawings shall be described in detail. This manipulator and control correspond to those manufactured by Cincinnati Milacron Industries Inc., the assignee of the present invention. While the detailed description of the preferred embodiment shall necessarily reflect the actual implementation, such details should not be construed as limitations on the present invention which is defined by the appended claims.

Figure 1:
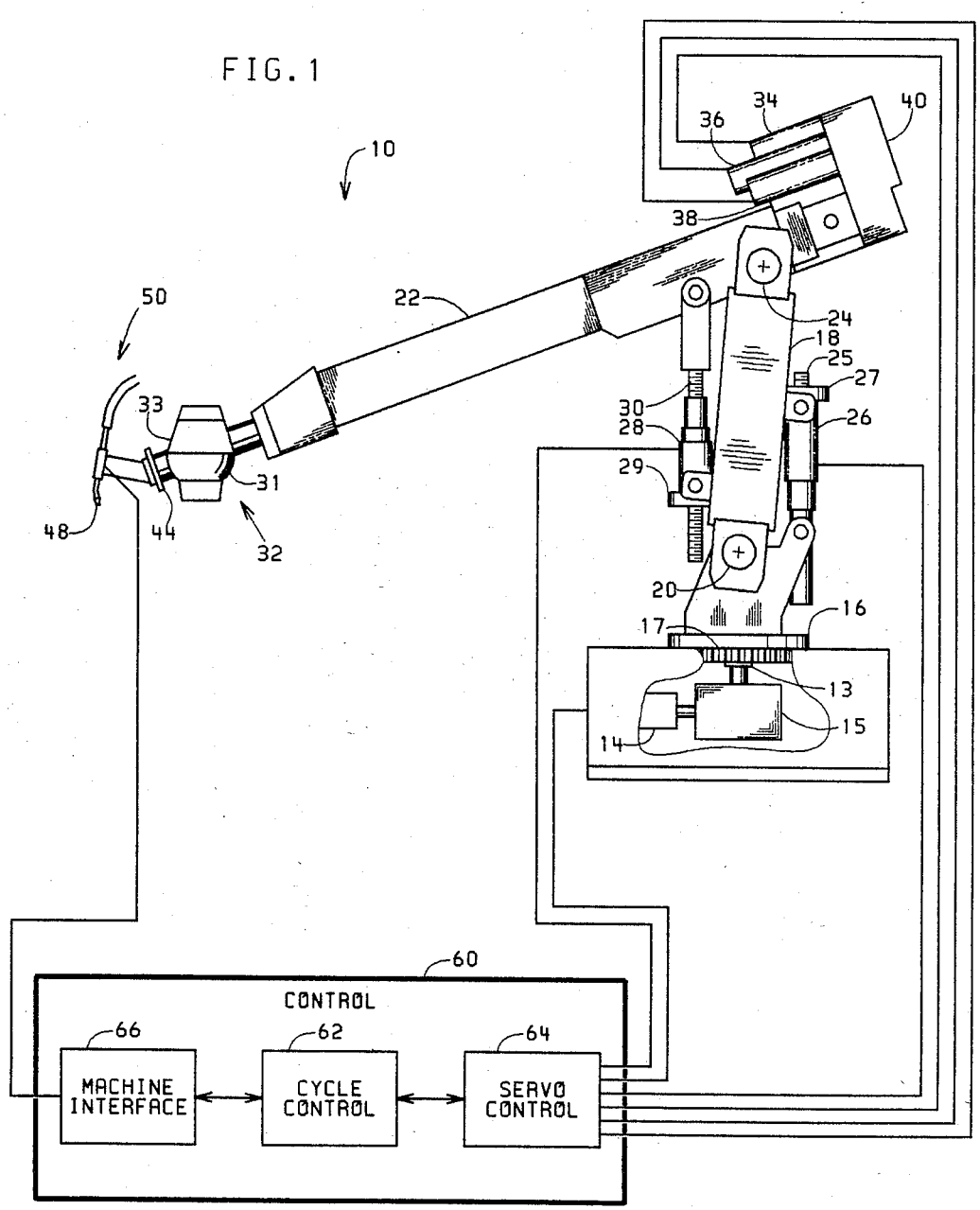
FIG. 1 shows an industrial manipulator and the schematic connection thereof to a control.

Referring to FIG. 1, a manipulator 10 is shown carrying a tool 50 and connected to a control 60. The manipulator is constructed so that the motion of its members describe axes of rotation. The first of these axes is called the base axis and is defined by rotation of the plate 16 about a vertical axis through its center. An upper arm 18 rotates about a horizontal axis, called the shoulder axis, through the center of pivot 20 intersecting the vertical axis of rotation of the base. A forearm 22 rotates about a horizontal axis called the elbow axis, through the pivot 24. Mounted at the end of forearm 22 is wrist 32 which provides three additional axes of rotation. The first of these is rotation of segment 33 about an axis lying parallel to or coincident with the longitudinal center line of forearm 22; the second is rotation of segment 31 about an axis perpendicular to the slice separating the inner segment 33 from the outer segment 31; and, the third is rotation of face plate 44 about an axis orthogonal thereto and through its center.

Rotations of members about the base, shoulder, and elbow axes are sufficient to define locations within the operating volume of the manipulator of a tool center-point 48 associated with the tool 50. Rotations of the inner and outer segments of the wrist 32 and the face plate 44 control orientations of the tool at the programmed locations in accordance with programmed orientation angles. Each of the six axes of motion is servocontrolled by connection of command and feedback signals to servocontrol 64 of the control 60. Operation of the tool 50 is accomplished by a machine interface 66 which responds to the programmed cycle of operation controlled by the cycle control 62. The cycle control 62 operates upon stored location, velocity, and function data to produce control signals for the servocontrol 64 and the machine interface 66. As shown, the tool 50 is a welding torch and control of the welding process is effected through the machine interface in response to stored function signals. Other tools for joining, cutting, cleaning, polishing, grasping, and so forth may be substituted for the torch shown and controlled through the machine interface 66.

Rotations of the upper arm and forearm about their respective axes are achieved by the linear motions of the screws 30 and 25 through the nuts 28 and 26. Rotation of the nuts is imparted through pulleys 29 and 27 respectively by drive motors not shown. Rotation of plate 16 about its axis is accomplished through the transmission 15 driving the pinion 13 which in turn drives ring gear 17 mounted to plate 16. The drive to transmission 15 is provided by motor 14. Rotation of the axes of wrist 32 is accomplished through concentric torque tubes, not shown, within forearm 22 driven by the motors 34, 36, and 38 through transmission 40. Position signals for each movable member are produced by position transducers, such as resolvers, which may be mechanically driven by motion of the machine member or the drive motor of the machine member.

Referring now to FIG. 2, the block diagram of the control of FIG. 1 shall be described. The control is implemented using a plurality of microprocessors communicating through a common bus. Applicants have chosen to use the commercially available 8085 and 8086 microprocessors produced by Intel Corporation. It will be recognized by those skilled in the art that any other suitable general purpose digital computer could be used to implement the control algorithms to be described hereinafter.

Cycle control 62 includes microprocessor 72 and interrupt control 74 both tied directly to the system bus 80. Operating system programs executed by microprocessor 72 are stored in memory 76 and include the programs identified as mode control 82, auto mode 84 and teach mode 86. Data defining the user specified locations, velocities and functions are stored in data store 78. Memory 76 is connected directly to system bus 80. The set of programs identified as auto mode 84 are used by microprocessor 72 to execute the cycle of operation defined by the data stored in data store 78. Execution of the auto mode programs is carried out by microprocessor 72 independently until execution is interrupted by an interrupt signal processed by interrupt control 74. While a variety of interrupts may be necessitated by equipment associated with control 60, only a single interrupt signal, produced by the servo control, is of relevance to the present invention.

Servo control 64 includes the servo supervisor 90 which preprocesses servo command signals produced by cycle control 62 and the servo input/output modules 92, 94, and 96 associated with the actual control of the manipulator axis drive motors. Servo input/output module 97 is associated with control of the workpiece positioner. The servo supervisor 90 includes a microprocessor 100, a programmable timer 102, and local memory 104 including the servo control process programs 105. Servo interrupt signals are periodically produced by the programmable timer 102. The period between interrupt signals defines the interval of each iteration of the path control procedures executed by the cycle control. The servo supervisor 90 receives machine axes command signals representing increments of motion of the manipulator and positioner members relative to their axes of rotation to be effected during the iteration interval. These machine axis command signals are processed by the servo supervisor 90 to produce servo command signals defining sub-increments for each of the machine axes effective for subdivisions of the iteration interval. The servo command signals are distributed to the servo input/output modules 92, 94, 96 and 97 at predefined sub-intervals of the iteration interval. The servo input/output modules 92, 94, 96 and 97 use the servo command signals and feedback signals produced by position transducers to control the machine axes drive motors.

The block diagram of the servo input/output module 92 is representative of the interconnection of elements of the servo input/output modules 94, 96 and 97. Data is transferred to and from the module from the system bus 80 through the dual port device 118. The module includes a local bus 116 interconnecting a microprocessor 106 with the dual port device 118, a local memory 112, the drive interface circuitry 110, and the machine axis position measuring transducer interface 108. The microprocessor 106 controls two machine axis drive motors, such as motors 124 and 126 in response to the servo command signals and the feedback signals according to the servo input/output program 114 stored in memory 112. Each machine axis servo command signal is compared to the corresponding current position signal as defined by the position transducer to produce a position error signal which is then applied to the drive interface circuitry 110 to produce a drive control signal for application to the associated machine axis drive motor.

Keeping in mind that each servo I/O module controls two machine drive axes, the blocks 128, 130 and 131 are understood to each represent two pairs of resolvers and drive motors. Servo command signals represent increments of machine axis motion to be effected within a few milliseconds. By contrast the machine axis command signals represent increments of machine member motion to be effected within the iteration interval of 10 to 20 milliseconds.

In addition to the generation of the machine axis command signals, cycle control 62 controls the execution of functions represented by input signals and associated with the tool 50 and a workpiece positioner to be performed at programmed locations. Function commands are stored with the program data in data store 78 and are executed in accordance with function execution sub-routines associated with the auto mode programs 84. Control of machine functions is effected through input/output devices, such as limit switches, push buttons, relays and solenoids. The machine input/output devices are directly controlled by the device I.O. module 132 in cooperation with the machine input/output interface circuitry 150. Data is transferred to and from the system bus 80 through the dual port device 146. The dual port device 146 is connected to the local bus 144 of the device input/output control module 132. Operation of the module is controlled by the local microprocessor 134 connected to bus 144 which executes programs stored in the local memory 140.

Connection of the machine input/output interface circuitry 150 to module 132 is accomplished through a serial interface circuit 136. A control cabinet operator panel 148 is connected by parallel lines to a parallel interface circuit 138. Monitoring and control of the interface circuits 138 and 136 are accomplished by the microprocessor 134 in response to respectively the control I.O. program 141 and the machine I.O. program 142 stored in local memory 140. Current conditions of machine input/output devices are reflected in device status signals transferred from the device I.O. module through the dual port device 146 to the cycle control 62. Function command signals produced by cycle control 62 in accordance with the stored program of operation are transferred over system bus 80 through dual port device 146 and ultimately to the appropriate machine input/output interface device by the serial interface 136.

In addition to signal exchange between machine device interfaces, the control permits exchange of data through the data input/output module 152 and its associated interfaces. While the cycle control 62 is operating under the auto mode programs 84, location data may be exchanged in response to function commands. This in-process data exchange takes place between an in-process data transceiver 174 and the control 60 through the data I.O. module 152. Location data from data store 78 is transferred from system bus 80 to the data I.O. module through its dual port device 166. The data I.O. module microprocessor 154 operating under control of the in-process transceiver I.O. program 162 stored in its local memory 158 transfers the location data from dual port device 166 to the serial channel interface 156 for transmission to the in-process data transceiver 174. In reverse, data from the in-process data transceiver 174 is input to the serial channel interface 156 and transferred therefrom on the local bus 164 to the dual port device 166. From there data is available to the cycle control 62 on the system bus 80.

In addition to the in-process data exchange just described, program data may be exchanged between the data store 78 of memory 76 and a bulk data store through a bulk data transceiver 172 or to a data terminal 170. Examples of a bulk data store include serial tape and data disk devices. A data terminal 170 may be used to display and modify program data for restorage after modification. In either event data is exchanged by the data I/O module microprocessor 154 operating in response to the appropriate program set such as, for example, the data terminal I/O program 160 or the bulk data transceiver I/O program 161. Data is transferred to and from the external device through the serial data interface 156 to the local bus 164 and through the dual port device 166 connected to system bus 80.

One final data input/output device, the teach pendent 168 is associated with the execution of teach mode programs 86 by the cycle control 62. Location and function data defining a programmed cycle of operation may be generated by an operator using the teach pendent 168. This pendent permits manual operation of manipulator 10 and the storage of location and function data in data store 78. As with the other data input/output devices, data is transferred to and from pendent 168 through the serial channel interface 156 to local bus 164 and therefrom through the dual port device 166 to the system bus 80. As the teach mode of operation does not form a part of the present invention further details thereof shall not be given herein. Additional details of the operation of the robot in the teach mode may be found in U.S. Pat. No. 3,920,972. The workpiece positioner is operated in the teach mode by means of auxillary motion buttons on the teach pendant. While motion of all workpiece positioner axes can be commanded in the teach mode the present invention provides for recording plural position data for the positioner axis which effects rotation of the table upon which the workpiece is mounted.

Figure 3A:
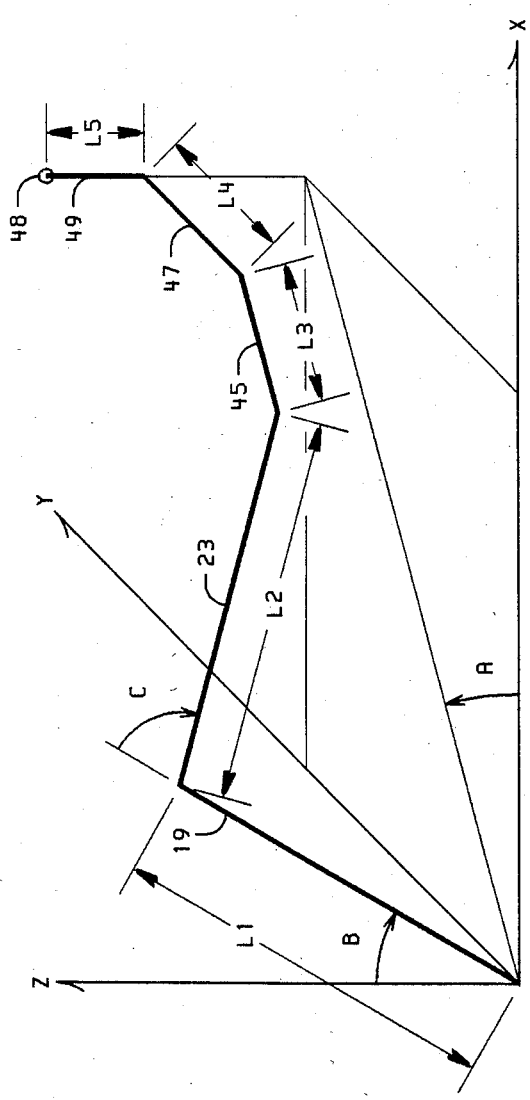
FIG. 3(a) is a schematic representation of the manipulator shown in the rectangular coordinate system defining coordinates of the programmed locations.

As it is an object of the auto mode programs 84 to control the motion of the manipulator members to produce motion of the tool centerpoint along a straight line path between programmed locations, a schematic representation of the manipulator shall be useful in describing the auto mode control algorithms. Such a schematic representation is depicted in FIG. 3(a). In FIG. 3(a) a series of line segments corresponding to the arm members of manipulator 10 are shown in relation to a rectangular coordinate system. The origin of this coordinate system corresponds to a point on the manipulator located at the intersection of the vertical axis of rotation of the base plate 16 and the horizontal axis of rotation through pivot 20. In this drawing, link 19 corresponds to upper arm 18, link 23 corresponds to forearm 22, link 45 corresponds to the span from the point of intersection of the three axes of rotation of wrist 32 to a point on the final axis of rotation (roll axis) the tool length distance from the face plate 44, link 47 corresponds to a first tool offset along the Y axis of a hand coordinate system and link 49 corresponds to a second tool offset along the Z axis of the hand coordinate system. Additional description of the hand coordinate system shall be provided subsequently.

The links of FIG. 3(a) are dimensioned respectively with lengths $L_1$, $L_2$, $L_3$, $L_4$ and $L_5$. The three axes of rotation of the base plate, upper arm, and forearm members are dimensioned by magnitudes of the angles A, B and C shown in FIG. 3(a). It will be appreciated by those skilled in the art with reference to FIG. 3(a) that the lengths $L_1$ through $L_5$ and the magnitudes of the angles A, B, and C completely define the location of the tool centerpoint 48 provided that the three axes of rotation of wrist 32 are so arranged that link 45 is along the axis of link 23. The introduction of rotation at the axes of wrist 32 provides for orientation of a function element associated with tool 50 through the tool centerpoint 48. Consequently, each set of input signals for a location includes input signals representing the rectangular coordinate values of the location of tool centerpoint 48 and the values of three orientation angles defining the orientation of the function element. The relationship of these orientation angles (Euler angles) to the wrist 32 shall be described with reference to FIGS. 3(b) and 3(c).

Figure 3B:
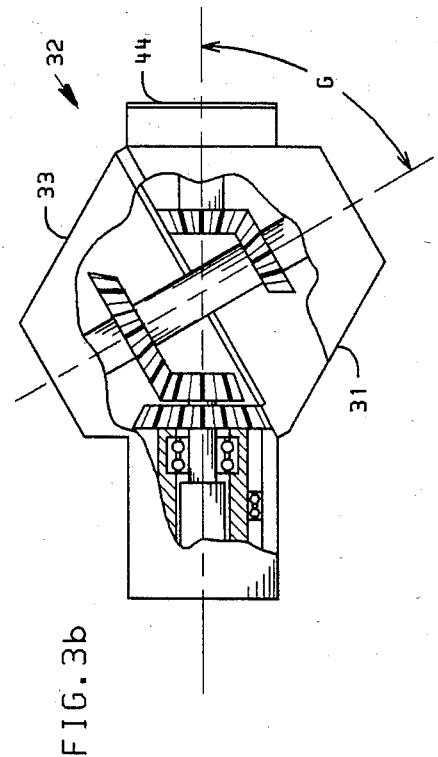
FIGS. 3(b) and 3(c) show the axes of motion of the manipulator wrist and the associated orientation angles defined by input signals.

In FIG. 3(b) wrist 32 is shown to consist of an inner segment 33 by which the wrist is attached to manipulator 10 and an outer segment 31 upon which face plate 44 is carried. The first axis of rotation of wrist 32 is a rotation of segment 33 about the longitudinal axis corresponding to link 23 of FIG. 3(a). The second axis of rotation of wrist 32 is rotation of outer segment 31 about an axis perpendicular to and through the center of the slice separating the inner segment 33 from the outer segment 31. The third axis of rotation of wrist 32 is rotation of the face plate 44 about the axis perpendicular to the plane of the face plate and through the center thereof. Tool 50 is mounted to face plate 44.

Figure 3C:
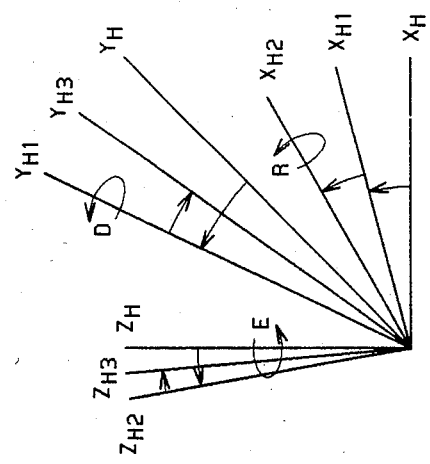

FIG. 3(c) illustrates how the orientation angles are defined with respect to a second rectangular coordinate system having its origin at the tool centerpoint 48. The axes of this coordinate system ($X_H$, $Y_H$, $Z_H$) are parallel to the axes of the rectangular coordinate system defining locations of the tool centerpoint. The Angles D, E and R define rotations relative to the hand coordinate system as follows:

(1) E is the magnitude of a rotation about $Z_H$ to align $X_H$ and $Y_H$ with $X_{H1}$ and $Y_{H1}$ respectively;

(2) D is the magnitude of a rotation about $Y_{H1}$ to align $X_{H1}$ with $X_{H2}$ and $Z_H$ with $Z_{H2}$ and (3) R is the magnitude of a rotation about $X_{H2}$ to align $Y_{H1}$ with $Y_{H3}$ and $Z_{H2}$ with $Z_{H3}$.

It will now be appreciated that the arm configuration is completely defined by the X, Y and Z coordinates of the tool centerpoint 48 and the orientation angles D, E, and R when the tool length and tool offset dimensions are known.

Figure 3D:
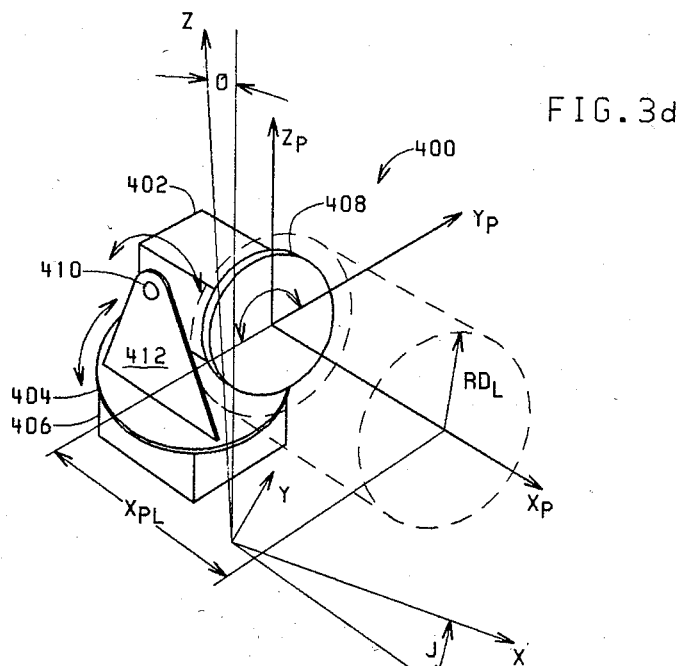
FIG. 3(d) shows the workpiece positioner and the rectangular coordinate system associated therewith.

Having now fully described the manipulator, and its control, the workpiece positioner shall be described with reference to FIG. 3(d). A workpiece, not shown in this Figure, is mounted on table 408 of positioner 400. The workpiece positioner rectangular coordinate system has its origin at the center of the surface of table 408 and is described as having its $X_p$ axis perpendicular to this table and through its center and its $Y_p$ and $Z_p$ axes in the plane at the surface of the table. The axes as shown reflect the positive directions. Table 408 is rotatably mounted to tilting member 402. Tilting member 402 rotates about a horizontal axis through pivot point 410 and flanges 412 (only one flange is shown in FIG. 3(d)). These flanges are rigidly fixed to plate 404 which is rotatably mounted upon base 406. Plate 404 rotates about a vertical axis through its center. While all motions of the members 404, 402 and 408 of the workpiece positioner 400 could be effected by servo controlled motors, the present invention provides for coordination only of rotation of table 408 with linear motion of the tool centerpoint 48. It is to be noted that a drive motor for effecting rotation of table 408 together with the associated position measuring device are connected to the manipulator control through the resolver and drive interface 131.

As shown in FIG. 3(d) the workpiece positioner includes two axes of rotation for controlling tilt and swing of the positioner table. The swing angle is a rotation about the positioner Z axis. The tilt angle is a rotation about the rotated positioner Y axis. The combination of these rotations and the initial alignment of the positioner coordinate system axes relative to the manipulator coordinate system axes are defined by two sets of additional input signals. The relative locations and orientations of the positioner coordinate system and the manipulator coordinate system are shown in FIG. 3(d). The first set of the additional input signals defines the rotations of the positioner coordinate system relative to the manipulator coordinate system. J represents the angle between the manipulator X axis 'X' and a rotated orientation thereof which would make it parallel to the positioner X axis '$X_p$'. The rotation represented by J is defined as positive in the counter-clockwise direction. The input signal O represents the angle between the manipulator Z axis 'Z' and a rotated orientation thereof which would make it parallel to the positioner Z axis '$Z_p$'. The rotation represented by O is defined as positive in the counter-clockwise direction. Transformation of coordinate values relative to the manipulator rectangular coordinate system to coordinate values relative to the workpiece positioner coordinate system are accomplished knowing the magnitude of the angles J and O and the location of the origin of the positioner coordinate system relative to the manipulator coordinate system. The second set of additional input signals represents the location of the origin of the positioner rectangular coordinate system relative to the manipulator rectangular coordinate system. The coordinate transformation is based on a matrix derived by performing successive rotations on the translational displacement of the workpiece positioner coordinate system relative to the rectangular coordinate system of the manipulator. The computations shall be more fully described subsequently.

While the positioner has been illustrated with plural axes of rotation, the present invention does not require any rotation other than rotation of the workpiece about a single axis. Tilt or swing may be achieved by set up or resettable alignment. Nevertheless, the angles of positioner coordinate system rotation relative to the manipulator coordinate system must be known for the coordinate transformation.

Also shown in FIG. 3(d) is the envelope of velocity coordination associated with workpiece positioner 400. This envelope is shown by dashed lines extending in the positive X direction from table 408. A cylinder is described by a radial limit $RD_L$ and an axial limit $X_{p1}$ relative to table 408. These limit distances are represented by further input signals. Tool centerpoint motion which commences within the velocity coordination envelope and which is programmed for simultaneous execution with rotation of the workpiece will result in coordination by the control of the tool centerpoint velocity with the workpiece surface velocity. The limit values of the velocity coordination envelope are set by the operator and may be changed as appropriate for the particular workpiece geometry.

It is the object of control of the auto mode programs 84 that motion between programmed locations of the tool centerpoint 48 be along a straight line path and that changes of orientation between programmed locations be accomplished by linearization of the orientation angle changes between the programmed locations. Motions may be executed which involve changes only of position or orientation as well as changes of both. In either event the control automatically determines the appropriate machine axis values to accomplish the change of position and/or orientation at the programmed rate, while maintaining the tool center point on the straight line path between programmed locations or at the programmed location of pure orientation moves.

The coordination of linear motion of the tool centerpoint with rotation of the workpiece will in general result in the generation of a spiral path on the workpiece surface. Therefore, the effective path length includes components of both the linear motion of the tool centerpoint and the rotation of the workpiece. To coordinate the interpolated motion of the tool centerpoint and the workpiece rotation and in particular, to achieve the desired velocity coordination, it is necessary to determine the dominant component of motion. That is, it is necessary to determine whether the linear motion of the tool centerpoint, the arc distance of the workpiece rotation, or the effective arc distance of orientation about the tool centerpoint is the longest of the motion components. The longest motion component controls the interpolation process and any motion which has an effective length less than the controlling motion component is interpolated so that all motion components are completed simultaneously.

Figure 4D:
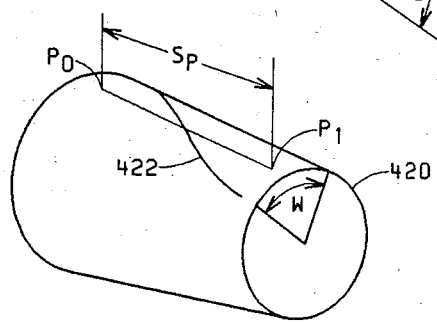
FIGS. 4(d) and 4(e) illustrate relative motions of the manipulator and workpiece.
Figure 4E:
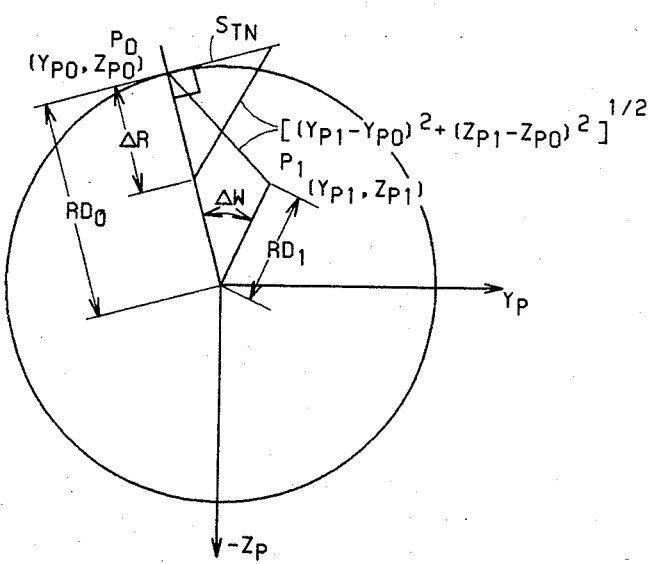
Figure 4A:
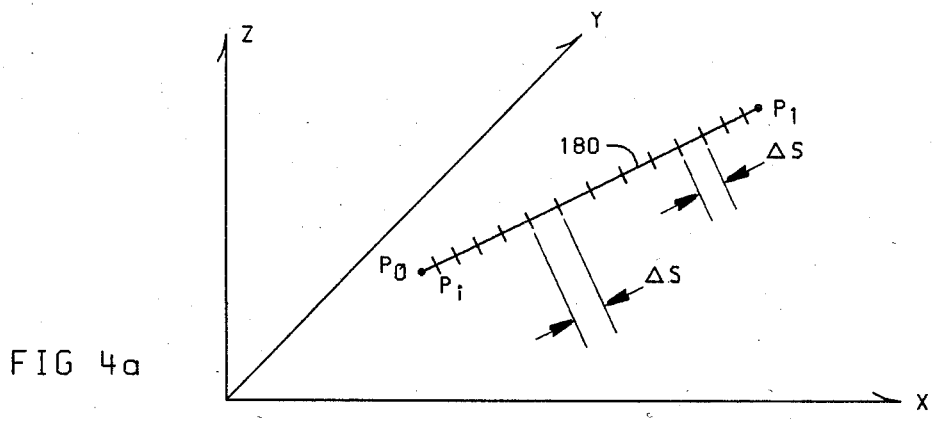
FIGS. 4(a) through 4(c) depict the motion effected by the controlled manipulator in an automatic mode of operation.

The motion control of the tool centerpoint effected by the path control algorithm is illustrated in FIG. 4(a). In this figure, programmed locations defined by input signals, are designated as $P_0$ and $P_1$. The straight line path connecting these programmed locations is represented by line segment 180. In automatic mode the control iteratively interpolates intermediate locations $P_i$ between the programmed locations $P_0$ and $P_1$. This interpolation is accomplished at the fixed iteration interval defined by the recurrence of the servo interrupt signals. As the tool centerpoint proceeds along path 180 between the programmed locations it may undergo acceleration and deceleration as reflected in the changing dimension of the iteration increments designated as $\Delta S$. The length $\Delta S$ of each iteration increment is defined as the product of the iteration interval period $\Delta t$ and the incremental velocity represented by an incremental velocity signal $V_k$. The incremental velocity is varied as a function of acceleration and deceleration and may be varied in response to unprogrammed changes of other parameters. The present invention provides for variation of the incremental velocity dynamically in response to changes in the rate of motion of the workpiece surface attributable to changes in workpiece diameter relative to workpiece length.

Figure 4B:
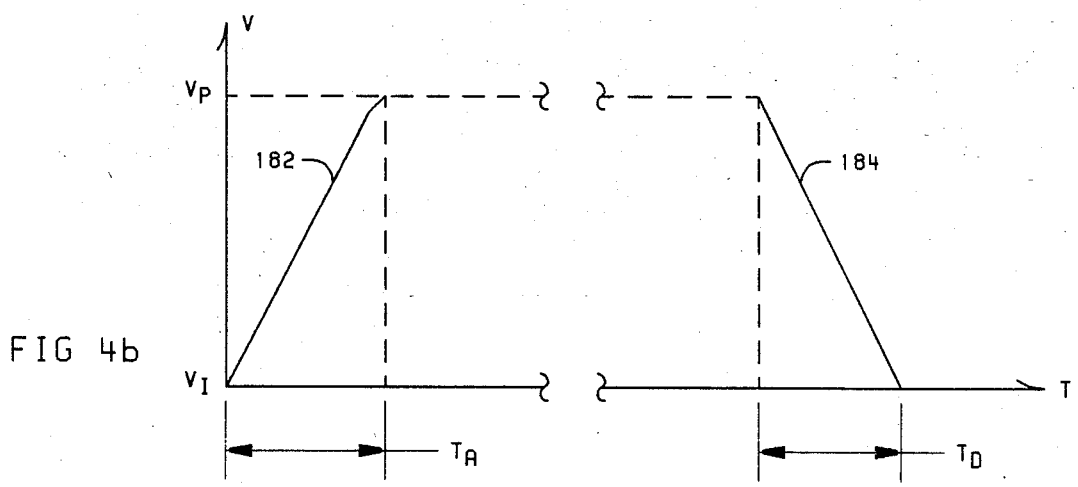

FIG. 4(b) illustrates the velocity profile for a move without velocity coordination between programmed locations starting at an initial velocity $V_i$ accelerating to the programmed velocity $V_p$ and decelerating to a final velocity $V_f$. The graph segments 182 and 184 correspond to the change of velocity with time in accordance with the constant acceleration function chosen by applicants. The respective periods of acceleration and deceleration are designated as $T_a$ and $T_d$.

Figure 4C:
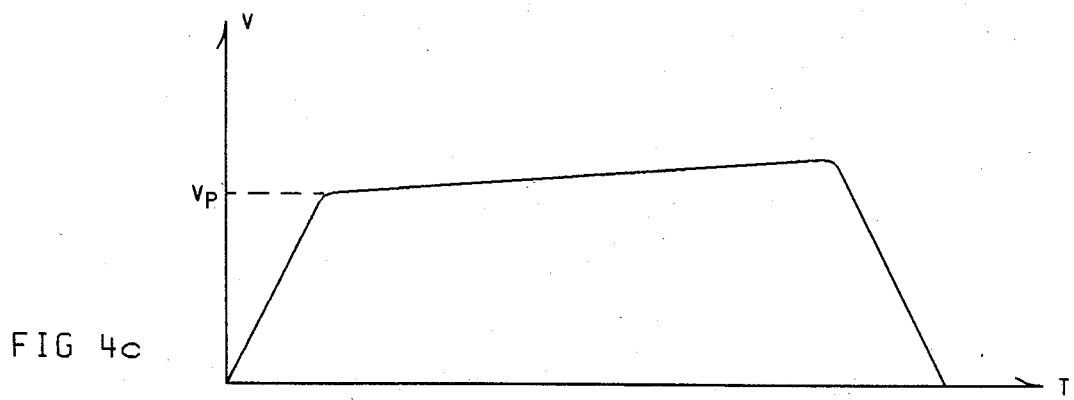

FIG. 4(c) shows the effects of velocity variations with velocity coordination in accordance with manipulator motion towards decreasing workpiece diameters. Again, the horizontal axis measures time and the vertical axis measures velocity. The velocity profile of FIG. 4(c) may be better understood with reference to the workpiece and combined motions illustrated in FIG. 4(d). A workpiece 420 is rotated through an angle W while the tool centerpoint traverses a linear path $S_p$. The resultant motion is illustrated on the workpiece surface as the spiral 422. The workpiece 420 is shown having a conical portion wherein the workpiece radius changes from $RD_0$ to $RD_1$ as the tool centerpoint traverses the linear span $S_p$. To achieve the desired relative velocity between the tool centerpoint and the workpiece surface, it is necessary to accommodate the decreasing workpiece radius by increasing the velocity of the tool centerpoint. Thus, referring to FIG. 4(c), following an initial acceleration period to an adjusted value of $V_p$, it is seen that the incremental velocity increases as the tool centerpoint is advanced along the linear path $S_p$. The same result would occur if the change of radial distance of the tool centerpoint from the axis of rotation of the workpiece arose from an inadvertant difference in the radial distances of the starting and ending locations.

FIG. 4(e) illustrates relative motion of the tool centerpoint to the workpiece rotation wherein the resultant combination has a substantial tangential component. A tangential component is to be expected where the linear path taught does not lie precisely in the same plane as the axis of rotation of the workpiece positioner table. This condition may result from lack of precision in teaching the linear span start and ending locations or from following the eccentricity of the workpiece relative to the axis of rotation of the positioner. In general, the tangential component is expected to be sufficiently small so that it can be ignored. However, applicants have recognized that situations may arise when the tangential component cannot be ignored. In this case, it is assumed that the spacing of programmed locations is such that a linear approximation of the actual relative motion between the tool centerpoint and workpiece surface is sufficiently accurate.

Tool centerpoint motion begins at point $P_0$ and advances to point $P_1$. As it traverses a linear path therebetween the tool centerpoint encounters a changing radius from $R_0$ to $R_1$ of $\Delta R$. The change of radius is calculated as the difference in the radial distances $RD_0$ and $RD_1$ at the locations $P_0$ and $P_1$. The length of the tangential deviation, that is, the length along a tangent to the radius at the end location $P_1$, is the length of the side of a right triangle having a hypoteneuse equal in length to the projection of path length in the plane of the positioner table and a side having a length equal to the change in radius. Thus, the tangential deviation is equal in length to the square root of the sum of the squares of the $Y_p$ and $Z_p$ components less the square of the change in radius. The value for tangential deviation is used to determine whether or not the magnitude of tangential deviation is substantial as compared to the arc length when calculating the effective linear distance traversed by the tool centerpoint relative to the workpiece surface.

As was previously stated, the path control algorithm of the present invention involves execution of the auto-mode programs 84. The auto-mode is concerned with two principal procedures, first to produce the axis command signals for each iteration and second to process the axis command signals for application to the axis drives. FIG. 5(a) is a flow chart of the overall procedure for producing the axis command signals. FIG. 5(b) is a flow chart of the procedure for processing the axis command signals and applying the resultant servo command signals to the axis drives.

Referring to FIG. 5(a) at process step 300 span data variables used in the interpolation process are initialized. These include the programmed span length $S_p$, the coordinate component ratios Ncc, and the transformation coeffients relating manipulator coordinates to positioner coordinates. Following the initialization of the span data variables process step 302 interpolates the span increment to produce the incremental span length signal $\Delta S$ and an accumulated span length signal $S_k$. At process step 304 the span increment is transformed from the rectangular coordinates and orientation angle input data to machine coordinate data defining the magnitudes of the increments of rotation about the manipulator and positioner axes. The subroutine associated with process step 304 produces the axis command signals and stores these signals in a buffer for access by the servosupervisor 90 on the occurence of the servo interrupt signal. Following the execution of the subroutine of process step 304 a test is made at decision step 306 to determine whether or not a flag indicating that no deceleration is required has been set. If the no deceleration flag has been set the process continues at decision step 310 where it is determined whether or not the present increment being interpolated is the last increment of the current linear span between programmed locations. If the current increment is the last increment of the span the process continues through the connector L3 to process step 330 where the function associated with the end of span is executed. Thereafter, decision step 332 determines whether or not the present location is the last location of the program. If not, further programmed location data will be processed by proceeding through the connector L1. If it is the last, the entire programmed cycle of operation will be reexecuted through the recycle of terminal 334.

Returning to decision step 306, had it been determined that the no deceleration flag was not set then the execution of the procedure continues at process step 308 where the distance remaining to the beginning of the deceleration subspan is calculated. This calculation produces the remaining distance signal $S_{rd}$. Thereafter at decision step 312 the magnitude of the remaining distance $S_{rd}$ is tested against the current incremental distance $\Delta S$ to determine whether or not the remaining distance $S_{rd}$ is less than the current incremental distance $\Delta S$. If the remaining distance is not less than the current incremental distance the process continues at step 314 where execution of a velocity modification subroutine is initiated by a subroutine call. A velocity modification subroutine may respond to any process parameter to produce changes in the incremental velocity to adapt the tool centerpoint velocity to process changes or to constrain manipulator axis velocities to their associated limits.

Referring to decision step 312, had it been determined that the distance remaining $S_{rd}$ was less than the incremental distance $\Delta S$, then execution of the procedure would continue at decision step 316 which determines whether or not motion is to continue through the programmed location defining the end of the current linear span. If the tool centerpoint is to come to rest at the end of the current span then decision step 316 will determine that the programmed location is not a continue point and the execution of the procedure will continue at process step 328 where execution of the deceleration subroutine is initiated by the call setting the final velocity parameter signal $V_f$ equal to zero. Upon completion of the execution of the deceleration subroutine, execution of the overall procedure continues at process step 330 where the function command associated with the end of the current span will be executed. Thereafter at decision step 332 it is determined whether the present programmed location is the last programmed location of the program. If it is, program execution is resumed by beginning at the first location of the stored program through the terminal 334 indicating that the program should be recycled. If the present location is not the last location of the stored program, execution proceeds through the connector L1 to interpolate the next programmed linear span.

Referring again to decision step 316, if it had been determined that the programmed location for the end of the current span is one through which motion of the tool centerpoint is to continue, execution of the overall cycle control procedure advances to process step 318 where the distance to a continue point end of span is calculated. The continue point end of span distance is found by first calculating the integral number of iterations I equal to the present incremental distance $\Delta S$ remaining in the current span length. Second, a new end point $S_{cp}$ is calculated for the current span, $S_{cp}$ being the difference between the programmed span length $S_p$ and the remainder R in excess of an integral number of current incremental distances $\Delta S$. Thereafter, at decision step 320 it is determined whether the angle included between the current linear span and the next linear span is less than 120°. If the included angle is less than 120° the motion of the tool centerpoint will be terminated at the final location $P_1$ of the current span.

The determination of the value of the included angle relies upon the rule of cosines. Two values for the span distance between the programmed location at the beginning of the present span and the programmed location at the completion of the next span are produced independently. That is, the span length $S_t^2$ is computed as the sum of the squares of the rectangular coordinate components while the value $S_t^2$ (120°) is computed as the sum of: the square of the span length $S_{cp}$ computed in process step 318; the square of span length $S_n$ of the next span; and the product of the next span length $S_n$ and the span length of the present span $S_{cp}$. If $S_t^2$ is less than $S_t^2$ (120°) then the included angle is less than 120°.

If it is determined at decision step 320 that the included angle is not less than 120° then execution of the overall procedure continues at decision step 321 where a subroutine for adjusting the velocity to achieve the desired relative velocity is called. The programmed velocity $V_p$ is adjusted during span data initialization and this subroutine call is required to produce a similarly adjusted value for the next programmed velocity $V_{pn}$ prior to the comparison of decision step 322. Thereafter, at decision step 322, the programmed velocity of the next span $V_{pn}$ is tested against the programmed velocity of the current span $V_p$ to determine which is greater. If the programmed velocity of the next span $V_{pn}$ is greater than or equal to the programmed velocity of the current span $V_p$ then the procedure continues at 326 where the no deceleration flag is set and thereafter through connector L2 to process step 302. If it had been determined at decision step 322 that the velocity of the next span $V_{pn}$ is less than the current programmed velocity $V_p$ then deceleration in the current span would be required and the procedure would continue at process step 324 where the execution of the deceleration subroutine is initiated by a subroutine call setting the final velocity parameter $V_f$ equal to the velocity of the next programmed span $V_{pn}$. Upon completion of execution of the deceleration subroutine, execution of the overall process continues through connector L3 at process step 330 where the function associated with the end of span is executed. Thereafter at decision step 332 it is determined whether the present location is the last location of the program. If it is, then the execution of the entire stored program is repeated through the recycle terminal 334. If the present location is not the last location of the program, execution of the overall process continues through the connector L1 with the aquisition of the data associated with the next programmed location. It will now be apparent that the overall cycle control comprises the repeated execution of the stored program. Motion between programmed locations involves the iterative production of incremental moves along the straight line path therebetween, and the incrementalization of workpiece rotations. The overall cycle comprises manipulator and workpiece positioner motion and the execution of programmed functions associated with the programmed locations.

Referring to FIG. 5(b) the servo interupt service routine executed by servocontrol 90 begins at decision step 340 where it is determined whether or not the buffer in which axis command signals are temporarily stored is empty. If the buffer is empty it is assumed that the cycle control has reached the end of span and an end of span signal is set at process step 344. If the buffer is found not to be empty by decision step 340 then the axis motion increments represented by the axis command signals are retrieved from the buffer at step 342. At terminal 348 the servo interupt routine is ended and exeuction of the overall cycle of operation by the cycle control 62 resumes. As was previously stated the servosupervisor 90 divides the increments represented by the axis command signals into subincrements and distributes the subincrements to the servo I.O. modules. The process of division and distribution of the servo command signals continues concurrently with the execution of the overall automatic mode procedure by the cycle control 70.

The description of major segments and subroutines associated with the flow chart of FIG. 5(a) shall be described with reference to FIGS. 6(a) through 6(f).

FIG. 6(a) is an expansion of the steps associated with process block 300 of FIG. 5(a). The span data initialization procedure begins at process step 200 where data are recalled from the data store 78. The recalled data includes the coordinate data for the present and next programmed locations given as $P_0$ and $P_1$. The motion control procedures process input signals representing coordinate values for the X, Y, and Z, coordinates and the D, E, and R orientation angles and the workpiece positioner rotation W. In addition, further input signals representing the programmed velocity $V_p$, the positioner origin coordinates, and the positioner coordinate system rotations are recalled from memory. At process step 201 the manipulator to positioner coordinate transformation coefficients are evaluated. At process step 202 a subroutine is called for calculating the span length of the linear span between the present and next programmed locations and orientation arc lengths and selecting the largest effective distance. The largest of these distances is represented by a programmed distance signal $S_p$ and controls intermediate point interpolation when no workpiece positioner rotation is programmed. At process step 203, a subroutine is called to compute the value of the effective linear distance of the combined motion of the tool centerpoint and the workpiece rotation. This value is represented by an effective linear distance signal $S_{pp}$ and is used by the relative velocity subroutine called by process step 205 to compute an adjusted value of programmed velocity required to produce a relative velocity between the tool centerpoint and the workpiece surface equal to the originally programmed velocity. At process step 204 coordinate component ratio signals $N_{XX}$ through $N_{WW}$ are computed as the quotient of changes of coordinates and the controlling linear distance represented by the programmed distance signal $S_p$. The coordinate component ratios are used by the transformation procedure to produce the coordinate components of each increment of distance along the linear path. These ratios define the linearization of the orientation angles as well as workpiece positioner rotation. Following the calculation of the coordinate component ratios, execution of the overall control procedure continues, as indicated by the terminal 208.

Referring again to FIG. 5(a) it is seen that following initialization of the span data, the control procedure continues with interpolation of a span increment as indicated by process block 302. FIG. 6(b) is an expansion of the process steps associated with process step 302. Referring to FIG. 6(b), at process step 214 the interpolation iteration counter is incremented. At decision step 212 it is determined whether the current incremental velocity represented by the incremental velocity signal $V_k$ is less than the programmed velocity $V_p$. If the increment velocity $V_k$ is less than the programmed velocity $V_p$ as adjusted then process execution continues at process step 216 which initiates execution of the acceleration subroutine by a subroutine call. Upon completion of execution of the acceleration subroutine the process execution would continue at step 213 where a velocity variable for modification $V_a$ is set equal to the current incremental velocity signal $V_k$. At process step 215 a velocity modification subroutine is called. This subroutine modifies the incremental velocity according to changes in the velocity of the workpiece surface encountered as the tool centerpoint advances relative to variations in workpiece diameter. That is, assuming that the workpiece approximates a portion of a cone, and assuming that the tool centerpoint path has a substantial component parallel to the longitudinal axis of the workpiece, the workpiece surface velocity relative to the tool centerpoint will change with the workpiece radius when the rate of rotation of the workpiece is constant. To produce the desired velocity of the workpiece surface relative to the tool centerpoint, the incremental velocity must be modified according to the change in workpiece radius. Following the incremental velocity modification, execution continues at process step 218 where the distance increment $\Delta S$ represented by an incremental distance signal is computed. The distance increment is the product of the iteration interval period $\Delta t$ represented by an iteration interval signal, and the average of the modified incremental velocity $V_{a(k-1)}$ of the preceeding iteration and the current incremental velocity $V_{ak}$. Thereafter at process step 220 the accumulated distance along the path is calculated as the sum of the previous accumulated distance $S_{k-1}$ and the incremental distance ΔS. Overall cycle control program execution continues through terminal 221.

If at decision step 212 it is determined that the increment velocity is not less than the programmed velocity then process execution continues at process step 210 where the incremental velocity is set equal to the adjusted programmed velocity. Execution then proceeds to process steps 213 and 215 to compute a new incremental velocity value as required. Thereafter, execution continues at process step 218 where an incremental distance ΔS is computed and thence to process step 220 where the accumulated distance is computed using the calculated value of the incremental distance ΔS. As before, upon completion of the calculation associated with process step 220, execution of the overall control procedure is resumed through the continue of terminal 221.

Upon completion of the execution of the process steps associated with process block 302 of FIG. 5(a) execution of the overall control procedure continues with the initiation of execution of the transformation procedure by the subroutine call at process step 304 at FIG. 5(a). This procedure transforms rectangular coordinates and angular coordinates of the interpolated intermediate location, orientation and rotation to coordinates for the movable machine members.

FIG. 6(c) is a flow chart of the transformation subroutine called by process step 304 of FIG. 5(a). At process step 222 of FIG. 6(c) values for the rectangular coordinates relative to the manipulator, the orientation angles, and the workpiece positioner rotation are computed for the current iterative increment of motion along the path. Each coordinate value is represented by an intermediate location coordinate signal and equals the sum of the corresponding value calculated for the immediately preceding iteration and the product of a coordinate component ratio and the incremental distance ΔS. Thus, intermediate location, orientation and workpiece positioner angular coordinates are all produced. Following the calculation at process step 224 the set of coordinate values are transformed to values of the machine coordinate system, that is, values for the axes of motion of the movable machine members. Because the manipulator axes are axes of rotation the transformation process requires solution of inverse trigonometric relationships. Details of the transformation process are set forth in U.S. Pat. No. 3,909,600, which, to the extent required to describe the transformation to machine coordinates, is incorporated herein by reference. Upon completion of the transformation to machine coordinates the incremental change of machine coordinates is computed at process step 226. At process step 228 the incremental change of machine coordinates represented by machine axis command signals are stored in a temporary buffer. Thereafter, execution of the overall control procedure is resumed by a return through terminal 230.

Referring again to FIG. 5(a), following the execution of the transformation subroutine at process step 304 the distance remaining to the beginning of a deceleration subspan is calculated by the process associated with process block 308. The steps of this process are illustrated in the flow chart of FIG. 6(d). At process step 232 of FIG. 6(d) the time necessary to decelerate from the current velocity to zero velocity is calculated by dividing the current incremental velocity represented by the increment velocity signal $V_{ak}$ by the constant of acceleration U. At process step 234 the distance required to decelerate from the current incremental velocity to zero is calculated using the time value calculated at process step 232. The deceleration distance $S_d$ is equal to one-half the product of the incremental velocity and the deceleration time $T_d$. At process step 236 the distance between the intermediate location produced by the current iteration and the beginning of the deceleration span is calculated by subtracting the accumulated distance $S_k$ and the deceleration distance $S_d$ from the programmed span length $S_p$. The resultant remaining distance $S_{rd}$ to the beginning of deceleration is used by the overall control procedure when execution thereof is resumed by the continue of terminal 238 to bring control procedure execution to decision step 12.

With reference to FIGS. 5(a) and 6(b) it is apparent that the deceleration subroutine differs in function from the acceleration subroutine in that it is used to achieve interpolation to the final velocity for the current span. The acceleration subroutine is used only to modify the increment velocity within the interpolation process.

Figure 6E:
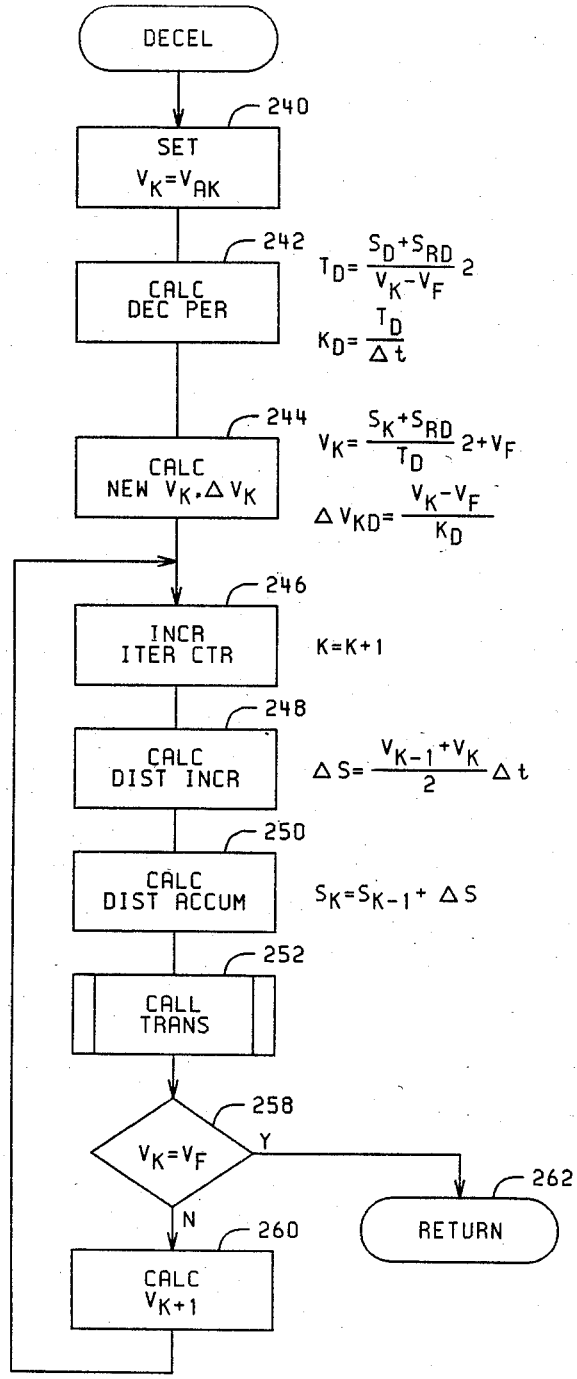
Figure 6F:
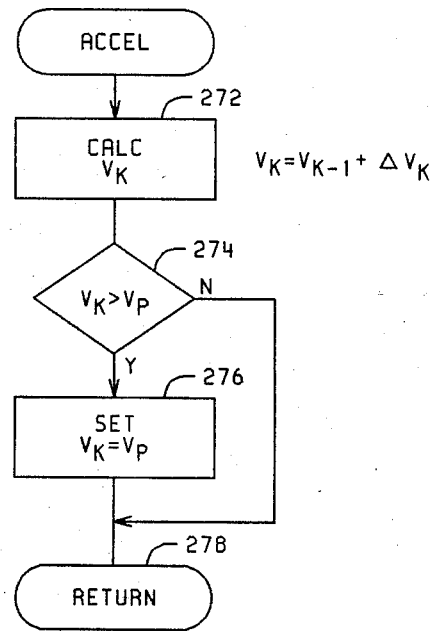

FIG. 6(e) is a flow chart of the deceleration subroutine. At process step 240 the incremental velocity signal is set equal to the modified increment velocity signal to begin decelleration. Execution continues through process steps 242 and 244 to produce a new value of incremental velocity effective for the first iteration of deceleration. At process step 246 the iteration counter is incremented. At process step 248 a value for the incremental distance ΔS is computed for the current iteration. At process step 250 the accumulated span distance $S_k$ is calculated using the incremental span distance ΔS just computed. At process step 252 execution of the transformation subroutine is initiated by a subroutine call.

Upon completion of execution of the transformation subroutine, execution of the deceleration subroutine is resumed at decision step 258 where it is determined whether or not the incremental velocity equals the final velocity previously established for the deceleration subroutine. If not, a new incremental velocity is calculated at process step 260 using the velocity of the current iteration and a velocity differential computed according to the deceleration period and the velocity difference computed when the deceleration subroutine execution was initiated. Thereafter, execution of the deceleration subroutine continues at process step 246. Process steps 246 through 260 are repeated until the deceleration subroutine produces the desired final velocity $V_f$. Thereafter, execution of the overall control procedure is resumed by the return through terminal 262.

Unlike the deceleration subroutine, the acceleration subroutine is an integral part of the interpolation process illustrated in the flow chart of FIG. 6(b). The acceleration subroutine is illustrated by the flow chart in FIG. 6(f).

Execution of the acceleration subroutine begins at process step 272 where a new incremental velocity value $V_k$ is computed by adding the previous value of the incremental velocity $V_{k-1}$ to the incremental velocity variation $\Delta V_k$. At decision step 274 the new velocity value $V_k$ is compared to the programmed velocity $V_p$. If found greater, the incremental velocity value $V_k$ is set equal to the programmed velocity $V_p$ at process step 276. Thereafter, execution of the overall control procedure is resumed by the return through terminal 278. If the incremental velocity computed by process step 272 does not exceed the programmed velocity, step 276 is skipped.

Further detailed description of the procedures associated with the auto-mode shall be given beginning with reference to FIG. 6(a). The pre-interpolation data initialization illustrated by FIG. 6(a) produces variable values used during the interpolation procedure. These values are computed using values represented by input signals defining two successive programmed tool centerpoint locations and a velocity therebetween, function element orientations, workpiece angular locations of rotations, and rotations of the positioner coordinate axes relative to the manipulator coordinate axes. The computation of process step 201 of coefficients for the manipulator to workpiece positioner coordinate transformation is illustrated in greater detail by the flow chart of FIG. 7(e).

Figure 7A:
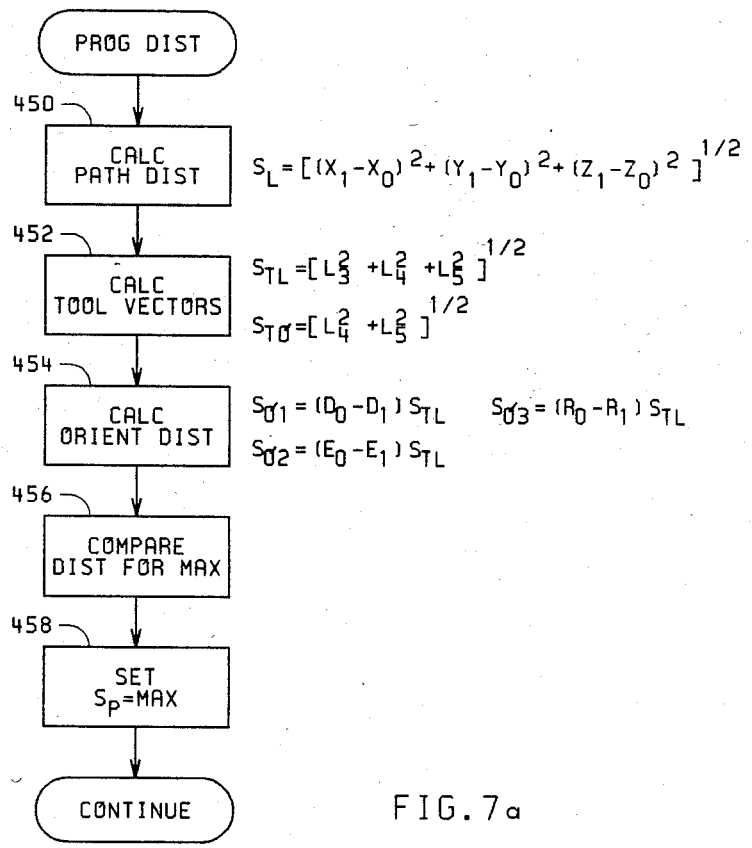
FIGS. 7(a) through 7(e) are flow charts of subroutines and major segments of the flow chart of FIG. 6
Figure 7B:
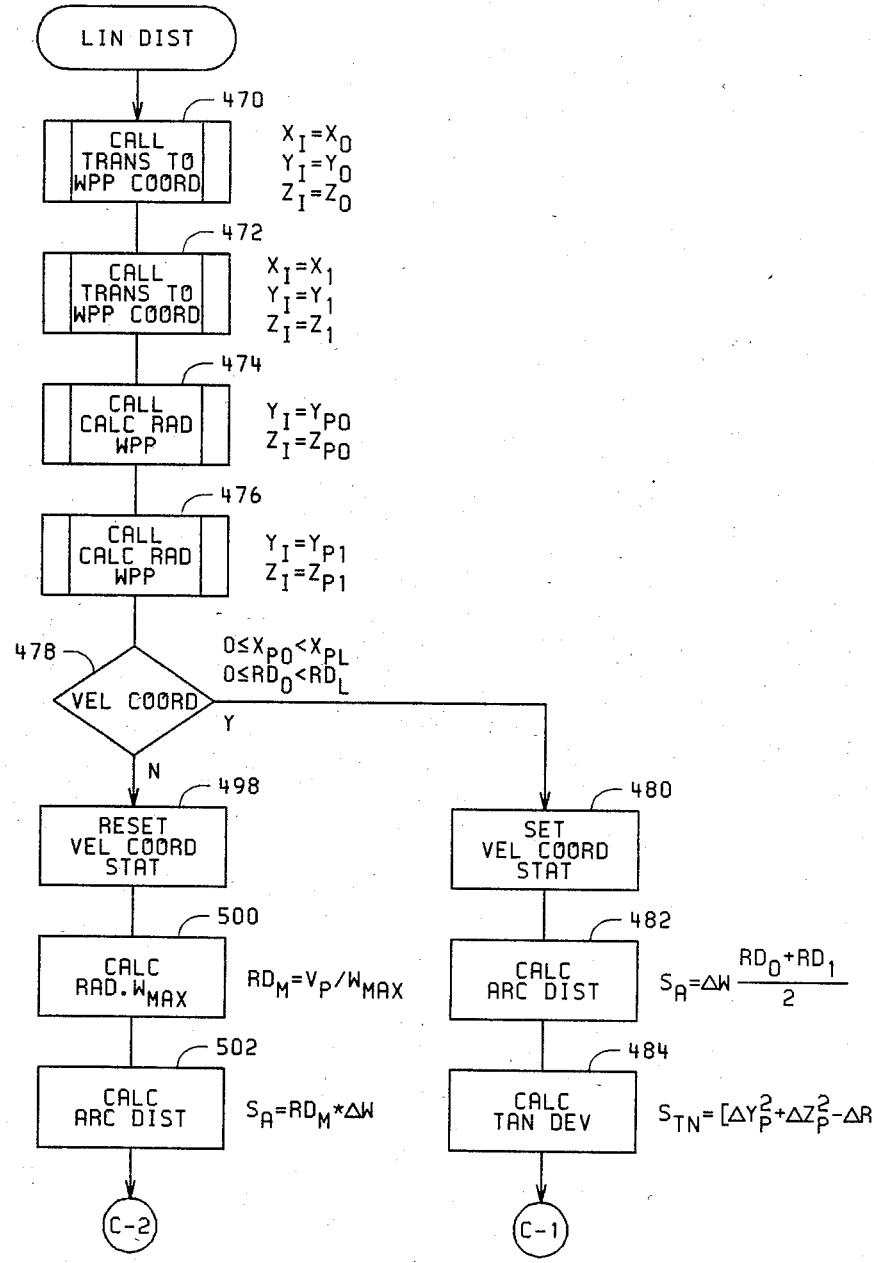
Figure 7C:
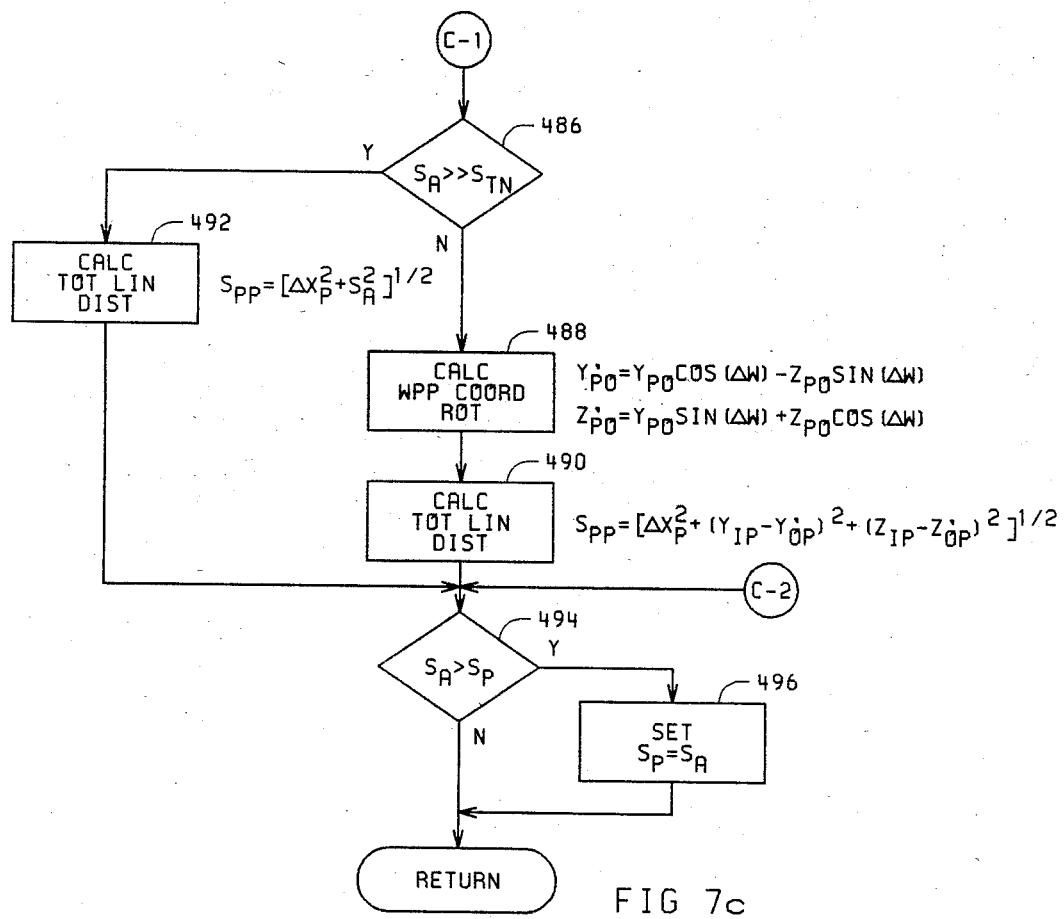
Figure 7D:
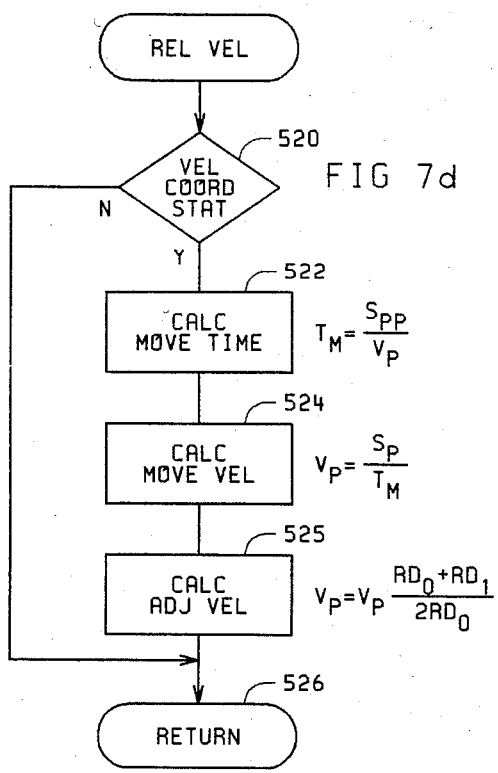
Figure 7E:
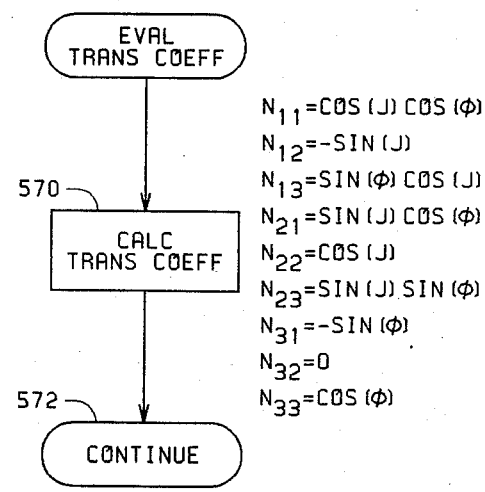

Referring to FIG. 7(e), computation of coefficients is illustrated at process step 570. The values of rotation J and O of coordinate axes of the manipulator relative to the positioner are used to produce the coefficients. Upon completion of the calculations of process step 570, execution of the procedure of FIG. 6(a) continues through terminal 572.

As has been previously stated herein, the iterative interpolation of intermediate points is controlled by the largest of the linear distances considering the linear span of tool centerpoint motion, the effective arc length produced by changes of orientation, and the arc length produced by rotation of the workpiece using the average value of the radial distance of the tool centerpoint from the axis of rotation of the workpiece. Referring again to FIG. 6(a), process step 202 calls the programmed distance subroutine which computes both the tool centerpoint span length and the effective arc length for orientation moves. The subroutine also determines which of these values is the larger and stores the larger value as the programmed span length variable to be used by other routines of the motion control procedures.

The programmed distance subroutine is illustrated by the flow chart of FIG. 7(a). At process step 450 the tool centerpoint path distance is calculated. This path length $S_L$ is equal to the square root of the sum of the squares of the rectangular coordinate components of a straight line connecting the points $P_0$ and $P_1$. At process step 452 the lengths of the tool vectors used in the calculation of the effective arc lengths for orientation changes are computed. These tool vectors include the tool length distance $S_{tL}$ which is equal to the square root of the sum of the squares of the tool length and tool offset lengths. The tool offset distance $S_{to}$ is equal to the square root of the sum of the squares of the tool offset lengths $L_4$ and $L_5$. At process step 454 the orientation arc lengths are computed using the programmed values of change of the orientation angles D, E, and R between the points $P_0$ and $P_1$ and the associated effective radius, that is, the tool vectors $S_{tL}$ or $S_{to}$. The three orientation arc lengths $S_{01}$, $S_{02}$ and $S_{03}$ together with the tool centerpoint programmed distance $S_L$ are compared at process step 456 to find the maximum value. At process step 458 the programmed distance signal $S_p$ is set equal to the maximum or largest of the values compared at process step 456. Thereafter the execution of the procedure of the flow chart of FIG. 6(a) is resumed by the return at terminal 460.

Referring again to the flow chart of FIG. 6(a), following execution of the programmed distance subroutine, process step 203 calls for the execution of the linear distance subroutine which is illustrated by the flow chart of FIGS. 7(b) and 7(c). The purpose of this subroutine is to compute the effective linear distance resulting from the combination of the linear motion of the tool centerpoint and the arc swept by the workpiece rotation.

Referring to FIG. 7(b) process steps 470 and 472 transform the rectangular coordinates relative to the manipulator rectangular coordinate system of the program locations $P_0$ and $P_1$ to values relative to the rectangular coordinates of the workpiece positioner coordinate system. These transformations are accomplished by calling the positioner transformation subroutine and executing the subroutine using the programmed location coordinates $X_0$, $Y_0$, and $Z_0$ and $X_1$, $Y_1$, and $Z_1$. The positioner transformation subroutine is illustrated by the flow chart of FIG. 8(b) which shall be described subsequently. Following transformation to the rectangular coordinate values for the workpiece positioner coordinate system, process steps 474 and 476 compute the radial distances from the axis of rotation of the workpiece positioner table to the programmed locations $P_0$ and $P_1$. These computations are carried out by a subroutine which is called by process steps 474 and 476 and which uses the coordinate values of the transformation executed by steps 470 and 472. The radius calculation subroutine is illustrated by the flow chart of FIG. 8(c) which shall be described subsequently.

At decision step 478, it is determined whether or not the tool centerpoint motion commences within the velocity coordination envelope. It will be recalled that the velocity coordination envelope is described in terms of a radial limit distance from the axis of rotation of the workpiece positioner table and an axial limit distance along the workpiece positioner X axis from the table surface in the positive direction. Therefore, having computed the coordinates of the location $P_0$ with respect to the workpiece positioner coordinate system and the radial distance $RD_0$ of the location $P_0$ from the axis of rotation, it is necessary to compare the computed values $X_{P0}$ and $RD_0$ against the limit values $X_{PL}$ and $RD_L$.

If the coordinates of the starting location $P_0$ are found to be within the velocity coordination envelope, execution of the linear distance subroutine proceeds at process step 480 where the velocity coordination status signal is set. At process step 482 the arc distance produced by rotation of the workpiece through the programmed angular change $\Delta W$ is computed using the average radius effective between locations $P_0$ and $P_1$, that is, the average of the radii $RD_0$ and $RD_1$. The workpiece surface arc distance is represented by an arc distance signal $S_a$ and is equal to the product of the average radius and the angular change of workpiece location $\Delta W$. At process step 484 the tangential deviation distance is computed to produce the value represented by the tangential deviation signal $S_{tn}$. It will be recalled that the tangential deviation is a measure of the magnitude of the tangential change of position of the tool centerpoint relative to the workpiece surface. The tangential deviation $S_{tn}$ is computed as the square root of the sum of the squares of the change in workpiece positioner coordinate components between programmed locations projected into the plane of the workpiece table and the difference of the square of the change of radius between the programmed locations $P_0$ and $P_1$. Execution of the linear distance subroutine continues through the off page connector C1 to the decision step 486 of the flow chart of FIG. 7(c).

Referring to FIG. 7(c), decision step 486 compares the tangential deviation $S_{tn}$ to the arc length represented by the arc distance signal $S_a$ to determine whether or not the component of tangential deviation is much less than the arc length. Where the component of tangential deviation is much less than the arc length, the tangential component of motion can be ignored. The effective linear distance is calculated at process step 492 as the square root of the sum of the squares of the change along the axis of rotation of the workpiece positioner and the arc length. If, at decision step 486, it had been determined that the component of tangential deviation $S_{tn}$ were substantial, i.e., not much less than the arc length $S_a$, computation of the total linear distance would be accomplished by process steps 488 and 490. The procedure thus used assumes a linear approximation of the relative distance between the tool centerpoint motion and the workpiece surface. At process step 488, the Y and Z coordinates relative to the workpiece positioner coordinate system are rotated by the angle $\Delta W$ of rotation of the workpiece. Under the foregoing assumption, this rotation of coordinates produces the required transformation to place the starting and ending locations within the same frame of reference. At process step 490, the effective linear distance is calculated as the square root of the sum of the squares of the change along the axis of rotation of the workpiece positioner $X_p$, and the change in position relative to the Y and Z axes of the workpiece positioner using the rotated coordinate values computed at process step 488.

At decision step 494 the arc length $S_a$ is compared with the programmed distance $S_p$ to determine the larger. Again, this comparison is used to determine a controlling value for interpolation of the programmed motion. If the arc length $S_a$ is greater than the programmed distance $S_p$, the programmed distance $S_p$ is set equal to the arc length $S_a$ at process step 496. If the programmed distance $S_p$ were equal to or greater than the arc length $S_a$ then, process step 496 would be skipped. Upon completion of the execution of the flow chart of FIG. 7(c) execution of the initialization procedure of FIG. 6(a) would continue by the return through terminal 508.

If it had been determined at decision step 478 that the starting location $P_0$ was not within the velocity coordination envelope, execution would proceed at process step 498 where the velocity coordination status signal is reset. Thereafter at process step 500, the radius, which at the maximum rate of rotation of the workpiece produces the programmed velocity $V_p$ is computed, that is, the maximum rotation rate radius $RD_m$ is computed by dividing the programmed velocity by the maximum rate of rotation. At process step 502 the arc distance $S_a$ is computed for the radius $RD_M$ computed at process step 500. Thereafter execution of the linear distance subroutine proceeds through the off page connector C2 to process step 494 of FIG. 7(c) where the programmed distance signal $S_p$ is compared to the computed value of the arc distance $S_a$. Thus, the effect of process steps 500, 502, and process step 494 is to fix the rate of rotation of the workpiece at the maximum value for the positioner.

Upon completion of execution of the linear distance computation subroutine, processing of the procedure of the flow chart of FIG. 6(a) continues with the execution of the relative velocity computation subroutine by the subroutine call of process step 205. The relative velocity computation subroutine is illustrated by the flow chart of FIG. 7(d). Referring to FIG. 7(d), it is determined at decision step 520 whether or not the velocity coordination status signal has been set. If the current programmed path does not require velocity coordination no action is executed by the subroutine and the processing of the routine of the flow chart of FIG. 6(a) is resumed by the return through terminal 526. If, on the other hand, the current span does require velocity coordination, execution proceeds at process step 522 where the time required to effect motion at the programmed velocity is computed. That is, the time $T_m$ move through the effective linear distance $S_{pp}$ computed by dividing the linear distance by the programmed velocity. At process step 524 a modified velocity value $V_p$ is computed by dividing the programmed distance signal $S_p$, representing the largest of the orientation arc lengths, the tool centerpoint linear distance, and the workpiece rotation arc length, by the time for the move $T_m$ calculated at process step 522. The effect of process steps 522 and 524 is to produce an adjusted programmed velocity signal $V_p$ equal in magnitude to the value required to produce a relative velocity between the tool centerpoint and the workpiece surface equal to the programmed velocity $V_p$. At process step 525 the adjusted programmed velocity signal is scaled by the ratio of the average radial distance to the initial radial distance. As described with reference to FIG. 4(e), the tool centerpoint is accelerated to this adjusted programmed velocity at the beginning of a move. Thereafter, velocity modifications correct for incremental changes of the radial distance. The calculation of process step 525 provides a limited velocity change between the initial acceleration and velocity modification only portions of motion.

Referring to the flow chart of FIG. 5(a) it is noted that the procedure of FIG. 6(a) is executed once prior to the interpolation of intermediate points for each programmed span. Consequently, the procedures illustrated by the flow charts of FIGS. 7(a), 7(b), 7(c), 7(d) and 7(e) are executed once to produce values used during interpolation. To achieve the desired velocity coordination, it is necessary to permit adjustment of the incremental velocity signal with each iteration according to the rate of motion of the workpiece surface relative to the tool centerpoint. As the tool centerpoint traverses a path between programmed locations associated with different workpiece diameters, the velocity of the workpiece surface changes in proportion to the radius, assuming a constant rate of workpiece rotation. This incremental adjustment of the incremental velocity signal $V_k$ occurs during incremental distance interpolation as illustrated by the flow chart of FIG. 6(b). The velocity adjustment procedure called by process step 215 of FIG. 6(b) is illustrated by the flow chart of FIG. 8(a).

Figure 8A:
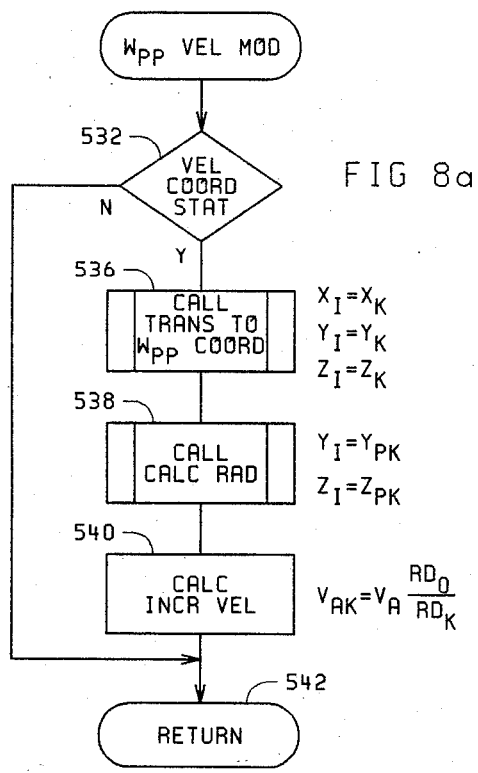
FIGS. 8(a) through 8(c) are flow charts of procedures for modifying the incremental velocity value according to the relative velocity between the tool centerpoint and the workpiece.

Referring to FIG. 8(a), at decision step 532 it is determined whether or not the velocity coordination status signal is set. If the velocity coordination status signal is not set, no velocity modification occurs and execution of the procedure of FIG. 6(b) is resumed by the return of terminal 542. If the velocity coordination status signal is set, process step 536 calls the execution of the subroutine for transforming rectangular coordinates relative to the manipulator to rectangular coordinates of the workpiece positioner coordinate system using the rectangular coordinates of the intermediate point. Upon completion of execution of the transformation subroutine the subroutine for computing the radius from the axis of rotation of the workpiece to the intermediate point is called into execution by the subroutine call of process step 538. At process step 540 the radial distance from the axis of rotation of the workpiece to the intermediate point, represented by an intermediate radial distance signal $RD_K$ is used to compute a modified value for the incremental velocity $V_k$. This modified value is equal to the product of the present value of the incremental velocity $V_k$ represented by the variable $V_a$ and the quotient resulting from division of the initial location radius signal $RD_0$ by the intermediate radial distance signal $RD_K$. The modified incremental velocity signal $V_{ak}$ will then be used in the interpolation subroutine to compute the incremental distance from which all coordinate components are derived.

Figure 8B:
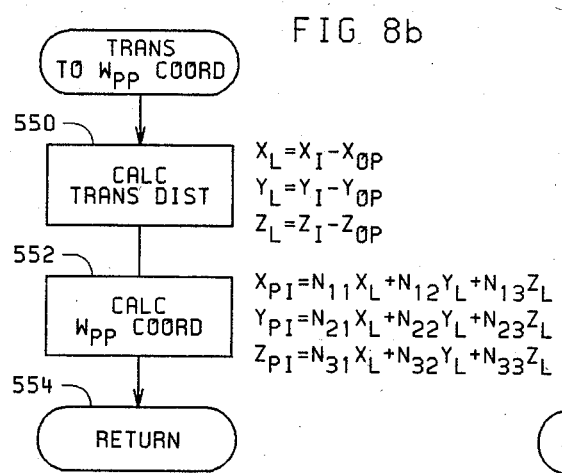

FIG. 8(b) is a flow chart illustrating the procedure for transforming rectangular coordinates relative to the manipulator to the workpiece positioner rectangular coordinate system. The procedure accepts location coordinate signals and produces transformed coordinate signals. This transformation is accomplished by first computing the effective translation between the rectangular coordinates relative to the manipulator and the rectangular coordinates of the workpiece positioner coordinate system origin and then using these values represented by translational displacement signals to effect the rotations associated with the rotations of the axes of the workpiece positioner rectangular coordinate system relative to the axes of the manipulator rectangular coordinate system. At process step 550 the translational components are computed. At process step 552 the rotation of the coordinates is computed using the transformation coefficients which were precomputed by the span data initialization procedure. The coefficients are based upon the rotations of the workpiece positioner rectangular coordinates from the rectangular coordinates relative to the manipulator as represented by the input signals J and O. Upon completion of the transformation effected by the procedure of FIG. 8(b) the rectangular coordinates relative to the workpiece positioner are available for use in computing the radial distance from the axis of rotation of the workpiece to the intermediate location.

Figure 8C:
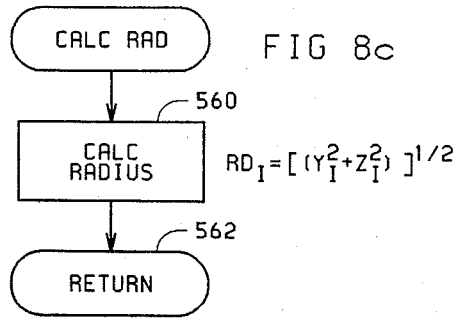

The calculation of radius is effected by the procedure illustrated in FIG. 8(c) which uses the transformed rectangular coordinates to compute the radial distance. The radial distance $RD_J$ is computed as a square root of the sum of the squares of the Y and Z components relative to the workpiece positioner rectangular coordinate system of the intermediate point. This computation is carried out by process step 560. Return to the execution of the calling procedure is effected through terminal 562.

As described herein, the control of coordinated motion of the workpiece rotation and manipulator translation and orientation, is achieved by interpolation of intermediate location, orientations and rotations. Interpolation is governed by a controlling distance, the largest of tool centerpoint translation, function element orientation and workpiece rotation. To produce the desired relative velocity between the tool centerpoint and workpiece surface, each iteration provides a modified incremental velocity, as the tool centerpoint translation effects changes of radial distance of the tool centerpoint from the axis of rotation of the workpiece. Tool centerpoint translation which result in a substantial tangential component is accommodated by further rotation of programmed locations coordinates to the same frame of reference from starting to ending locations. In all cases, velocity coordination is accomplished in the automatic mode of operation using data defining coordinates of starting and ending locations, orientations and workpiece angular locations of successive programmed points, together with a programmed velocity defining the desired relative velocity between the tool centerpoint and workpiece surface. Automatic accommodation of rotations of the axis of rotation of the workpiece relative to axes of the manipulator rectangular coordinate system is achieved using further input data defining the magnitudes of the rotations.

While the invention has been illustrated in some detail according to the preferred embodiment shown in the accompanying drawings and while the preferred embodiment has been described in some detail, there is no intention to thus limit the invention to such detail. On the contrary, it is intended to cover all modifications, alterations and equivalents falling within the spirit and scope of the appended claims.

What is claimed is:

1. Method for cooperatively controlling motion of a tool centerpoint associated with the function element carried by a manipulator and rotation of a workpiece carried by a positioner, the motion effected by the manipulator being along a linear path intersecting the axis of rotation of the workpiece, the motion being defined by input signals, the manipulator and positioner having movable members driven by actuators controlled by servomechanism circuits, the relative motion of the tool centerpoint and workpiece surface being effected at a velocity represented by an input signal, the method comprising the steps of:
   a. iteratively producing incremental velocity signals in response to the input signals, each incremental velocity signal representing the velocity of the tool centerpoint during an iteration interval;
   b. modifying the incremental velocity signals in proportion to the change in radial distance of the tool centerpoint from the axis of rotation of the workpiece between successive iterations;
   c. producing intermediate location coordinate signals in response to the modified incremental velocity signals, the intermediate location coordinate signals representing coordinates relative to a rectangular coordinate system associated with the manipulator of an intermediate location along the linear path of the tool centerpoint and an intermediate rotation of the workpiece; and
   d. applying the intermediate location coordinate signals to the servomechanism circuits to effect coordinated motion of the movable members of the manipulator and positioner.

2. The method of claim 1 wherein the input signals define coordinates of starting and ending locations of the tool centerpoint motion and the workpiece rotation and the relative velocity between the tool centerpoint and the workpiece surface and the method further comprises the steps of:
   a. producing an effective linear distance signal representing the distance resulting from the combination of tool centerpoint motion and workpiece rotation; and
   b. producing an adjusted programmed velocity signal in response to the effective linear distance signal, the adjusted programmed velocity signal representing the velocity of the tool centerpoint which results in a relative velocity between the tool centerpoint and the workpiece surface equal to the programmed velocity.

3. The method of claim 2 wherein the step of producing intermediate location coordinate signals further comprises the steps of:
   a. producing a programmed distance signal representing the larger of the linear distance traversed by the tool centerpoint between two programmed locations and the arc length swept by the average radial distance of the tool centerpoint from the axis of rotation when rotated through the programmed angular change of the workpiece;
   b. producing coordinate component ratio signals, each coordinate component ratio signal representing the quotient of the change in magnitude of a selected coordinate and the programmed distance signal;
   c. producing an incremental distance signal in response to the increment velocity signal and an interation interval signal representing the period between iterations, the incremental distance signal representing an increment of motion occurring over the iteration period; and
   d. producing coordinate component signals in response to the incremental distance signal and the coordinate component ratio signals, the coordinate component signals representing coordinate components of the incremental distance.

4. The method of claim 3 wherein the axis of rotation of the workpiece is not parallel to any of the axes of the manipulator rectangular coordinate system and the step of modifying the incremental velocity signals further comprises the steps of:
   a. producing transformed coordinate signals representing coordinates of programmed locations relative to a workpiece positioner coordinate system;
   b. producing intermediate radial distance signals in response to the transformed coordinate signals, the intermediate radial distance signals representing the radial distance from the axis of rotation of the workpiece to the intermediate tool centerpoint location; and
   c. producing a modified increment velocity signal in response to the intermediate radial distance signal, the incremental velocity signal, and the starting location radial distance signal, the modified increment velocity signal representing the velocity of the tool centerpoint which results in a relative velocity between the tool centerpoint and the workpiece surface at the programmed velocity at the intermediate location of the tool centerpoint.

5. A method for selectively, cooperatively controlling motion of a tool centerpoint associated with the function element carried by a manipulator and rotation of a workpiece carried by a positioner, the motion effected by the manipulator being along a linear path intersecting the axis of rotation of the workpiece, the motion being defined by input signals representing starting and ending locations of the tool centerpoint relative to a rectangular coordinate system associated with the manipulator and starting and ending angular locations of the workpiece relative to the axis of rotation of the workpiece, the manipulator and positioner having movable members driven by actuators controlled by servomechanism circuits, the relative motion of the tool centerpoint and workpiece surface being effected at a velocity represented by an input signal, and axial and radial limit distances relative to the workpiece positioner being defined by further input signals, the method comprising the steps of:
   a. producing a velocity coordination status signal in response to the input signals, the velocity coordination status signal representing the presence of a starting location within an envelope defined by the axial and radial limit distance input signals;
   b. producing an effective linear distance signal representing the distance resulting from the combination of tool centerpoint motion and workpiece rotation;
   c. producing an adjusted programmed velocity signal in response to the effective linear distance signal and the programmed velocity signal, the adjusted programmed velocity signal representing the velocity of the tool centerpoint which results in a relative velocity between the tool centerpoint and the workpiece surface equal to the programmed velocity;
   d. iteratively producing incremental velocity signals in response to the adjusted programmed velocity signal and the location coordinate and rotation input signals, each incremental velocity signal representing the velocity of the tool centerpoint during an iteration interval;
   e. modifying the incremental velocity signals in proportion to the change in radial distance of the tool centerpoint from the axis of rotation of the workpiece between successive programmed locations;
   f. producing intermediate location coordinate signals in response to the modified incremental velocity signals, the intermediate location coordinate signals representing coordinates relative to a rectangular coordinate system associated with the manipulator of the tool centerpoint and intermediate rotations of the workpiece; and
   g. applying the intermediate location coordinate signals to the servomechanism circuits to effect coordinated motion of the tool centerpoint and the workpiece.

6. The method of claim 5 wherein the step of producing a velocity coordination status signal further comprises the steps of:
   a. producing transformed location coordinate signals in response to the location coordinate input signals, the transformed location coordinate signals representing coordinates of the tool centerpoint relative to a rectangular coordinate system having its origin in the plane of the positioner to which the workpiece is mounted and having one axis substantially coincident with the axis of rotation of the workpiece;
   b. producing a radial distance signal in response to the transformed location coordinate signals, the radial distance signal representing the radial distance from the axis of rotation of the workpiece to the starting location coordinates;
   c. comparing the transformed location coordinate signals and the radial distance signal to the axial and radial limit distance input signals; and
   d. producing the velocity coordination status signal in response to detecting the presence of a starting location within the envelope defined by the axial and radial limit distance signals.

7. The method of claim 6 wherein the axis of rotation of the workpiece is not parallel to any of the rectangular coordinate axes associated with the manipulator and further input signals define the rotations of the coordinate axes of the manipulator coordinate system with respect to the axes of the manipulator coordinate system and further define the location of the origin of the positioner coordinate system relative to the manipulator coordinate system and the step of transforming location coordinate signals further comprises the steps of:
  a. producing a translational displacement signal representing the linear distance between the location and the origin of the positioner rectangular coordinate system; and
  b. producing transformed location coordinate signals in response to the translational displacement signal and the positioner coordinate system rotation input signals, the transformed location coordinate signals representing coordinates of the location relative to the positioner rectangular coordinate system.

8. A method for cooperatively controlling motion of the tool centerpoint associated with the function element carried by a manipulator and rotation of a workpiece carried by a positioner, the motion effected by the manipulator being along a linear path intersecting the axis of rotation of the workpiece, the motion being defined by input signals representing coordinates of starting and ending locations of the tool centerpoint motion relative to a rectangular coordinate system associated with the manipulator, starting and ending orientations of the function element through the tool centerpoint at the programmed locations and starting and ending angular locations of the workpiece, the manipulator and positioner having movable members driven by actuators controlled by servomechanism circuits, the relative motion of the tool centerpoint and workpiece surface being effected at a velocity represented by an input signal, the method comprising the step of:
  a. producing an effective linear distance signal representing the distance resulting from the combination of tool centerpoint motion and workpiece rotation;
  b. producing an adjusted programmed velocity signal in response to the effective linear distance signal and the programmed velocity signal, the adjusted programmed velocity signal representing the velocity of the tool centerpoint which results in a relative velocity between the tool centerpoint and the workpiece surface equal to the programmed velocity;
  c. iteratively producing incremental velocity signals in response to the location coordinate input signals and the adjusted programmed velocity signal, each incremental velocity signal representing the velocity of the tool centerpoint during an iteration interval;
  d. modifying the incremental velocity signals in proportion to the change in radial distance of the tool centerpoint from the axis of rotation of the workpiece between successive programmed locations;
  e. producing intermediate location coordinate signals in response to the modified incremental velocity signal, the intermediate location coordinate signals representing coordinates relative to the manipulator rectangular coordinate system of intermediate locations of the tool centerpoint and intermediate orientations of the function element and intermediate angular locations of the workpiece; and
  f. applying the intermediate location coordinate signals to the servo mechanism circuits to effect coordinated motion between the tool centerpoint and the workpiece.

9. The method of claim 8 wherein the step of producing intermediate location coordinate signals further comprises the step of:
  a. producing a programmed distance signal representing the largest of the linear distance traversed by the tool centerpoint, the effective arc length swept by the function element through the programmed orientation changes, and the arc length swept by the average radial distance of the tool centerpoint from the axis of rotation of the workpiece between the start and finish rotations of the workpiece;
  b. producing coordinate component ratio signals, each coordinate component ratio signal representing the quotient of the change in magnitude of a coordinate and the programmed distance signal;
  c. producing an incremental distance signal in response to the incremental velocity signal and an iteration interval signal representing the period between iterations, the incremental distance signal representing an increment of motion occurring over the iteration period; and
  d. producing coordinate component signals in response to the incremental distance signal and the coordinate component ratios, the coordinate component signals representing coordinate components of the incremental distance.

10. The method of claim 9 wherein the axis of rotation of the workpiece is not parallel to any of the coordinate axes of the rectangular coordinate system associated with the manipulator and the step of modifying the incremental velocity signals further comprises the steps of:
  a. producing transformed coordinate signals representing coordinates of programmed locations relative to a workpiece positioner rectangular coordinate system having its origin in the plane of the positioner to which the workpiece is mounted and one axis substantially coincident with the axis of rotation of the workpiece.
  b. producing intermediate radial distance signals in response to the transformed location coordinate signals, the intermediate radial distance signals representing the radial distance from the axis of rotation of the workpiece to the intermediate tool centerpoint location; and
  c. producing a modified increment velocity signal in response to the intermediate radial distance signal, the increment velocity signal and the starting location radial distance, the modified incremental velocity signal representing the velocity of the tool centerpoint resulting in a relative velocity between the tool centerpoint and the workpiece surface equal to the programmed velocity at the intermediate location.

11. Apparatus for cooperatively controlling motion of a tool centerpoint associated with a function element carried by a manipulator and rotation of a workpiece carried by a positioner, the motion effected by the manipulator being along a linear path intersecting the axis of rotation of the workpiece, the motion being defined by input signals, the manipulator and positioning device having movable members driven by actuators controlled by servomechanism circuits, the relative motion of the tool centerpoint and workpiece surface being effected at a velocity represented by an input signal, the apparatus comprising:
  a. means for storing input signals;

b. means responsive to the input signals for iteratively producing incremental velocity signals, each incremental velocity signal representing the velocity of the tool centerpoint during an iteration interval;
c. means for modifying the incremental velocity signal in proportion to the change in radial distance of the tool centerpoint from the axis of rotation of the workpiece between successive iterations;
d. means responsive to the modified incremental velocity signal for producing intermediate location coordinate signals representing coordinates of an intermediate location along the linear path of the tool centerpoint relative to a rectangular coordinate system associated with the manipulator and an intermediate angular coordinate of the workpiece rotation relative to the axis of rotation of the workpiece;
e. means for applying the intermediate location coordinate signals to the servomechanism circuits to effect coordinated motion of the tool centerpoint and the workpiece at a relative velocity defined by the velocity input signal.

12. The apparatus of claim 11 wherein the means for producing intermediate location signals further comprises:
a. means for producing a programmed distance signal representing the larger of the linear distance traversed by the tool centerpoint and the arc length swept by the average radial distance of the tool centerpoint from the axis of rotation of the workpiece through the angular change of location of the workpiece;
b. means for producing coordinate component ratio signals, each coordinate component ratio signal representing the quotient of the change in magnitude of a selected coordinate and the programmed distance signal;
c. means responsive to the modified incremental velocity signal and an iteration interval signal representing the period between iterations for producing an incremental distance signal representing an increment of motion occurring during an iteration; and
d. means responsive to the incremental distance signal and the coordinate component ratio signals for producing the coordinate component signals representing coordinate components of the incremental distance.

13. The apparatus of claim 12 wherein the input signals define coordinates of starting and ending locations of the tool centerpoint motion relative to the manipulator rectangular coordinate system and the workpiece rotation and the apparatus further comprises:
a. means for producing an effective linear distance signal representing the distance resulting from the combination of tool centerpoint motion and workpiece rotation; and
b. means responsive to the effective linear distance signal for producing an adjusted programmed velocity signal representing the velocity of the tool centerpoint which results in a relative velocity between the tool centerpoint and the workpiece surface equal to the programmed velocity.

14. The apparatus of claim 13 wherein the axis of rotation of the workpiece is not parallel to any of the coordinate axes defining locations of the tool centerpoint and the apparatus further comprises means for producing transformed coordinate signals representing coordinates of tool centerpoint locations relative to a workpiece positioner rectangular coordinate system having its origin in the plane upon which the workpiece is mounted and having one axis substantially coincident with the axis of rotation of the workpiece.

15. The apparatus of claim 14 wherein the means for modifying the incremental velocity signals further comprises:
a. means responsive to the transformed coordinate signals for producing an intermediate radial distance signal representing the radial distance from the axis of rotation of the workpiece to the intermediate tool centerpoint location; and
b. means responsive to the intermediate radial distance signal, the increment velocity signal and the radial distance signal of the starting location for producing a modified increment velocity signal.

16. Appratus for cooperatively controlling motion of a tool centerpoint associated with a function element carried by a manipulator and rotation of a workpiece carried by a positioner, the motion effected by the manipulator being along a linear path oblique to the axis of rotation of the workpiece and having a component tangent to an arc swept by a radius from the axis of rotation of the workpiece to the tool centerpoint, the motion being defined by input signals representing starting and ending locations of the tool centerpoint relative to a rectangular coordinate system associated with the manipulator and the starting and ending angular locations of the workpiece, the manipulator and positioner having movable members driven by actuators controlled by servomechanism circuits, the relative motion of the tool centerpoint and workpiece surface being effected at a velocity represented by an input signal, the apparatus comprising:
a. means for storing input signals;
b. means responsive to the input signals for producing an effective linear distance signal representing the distance resulting from the combination of tool centerpoint motion and workpiece rotation;
c. means responsive to the effective linear distance signal for producing an adjusted programmed velocity signal representing the velocity of the tool centerpoint which results in a relative velocity between the tool centerpoint and the workpiece surface equal to the program velocity;
d. means responsive to the input signals and the adjusted velocity signal for iteratively producing incremental velocity signals, each incremental velocity signal representing the velocity of the tool centerpoint during an iteration interval;
e. means for modifying the incremental velocity signals in proportion to the change in radial distance of the tool centerpoint from the axis of rotation of the workpiece between successive iterations;
f. means responsive to the modified incremental velocity signal for producing intermediate location coordinate signals representing coordinates relative to the manipulator coordinate system of an intermediate location along the linear path of the tool centerpoint and further representing intermediate rotations of the workpiece; and
g. means for applying the intermediate location coordinate signals to the servo mechanism circuits to effect coordinated motions between the tool centerpoint and the workpiece.

17. The apparatus of claim 16 wherein the means for producing an effective linear distance signal further comprises:
  a. means for producing a tangential deviation signal representing the tangential distance between two successive programmed locations of the tool centerpoint;
  b. means for producing an arc distance signal representing the arc length swept by the average radial distance of the tool centerpoint from the axis of rotation of the workpiece when rotated through the programmed angular change of the workpiece;
  c. means responsive to the tangential deviation signal and the arc distance signal for comparing the magnitudes thereof; and
  d. means responsive to the comparing means for producing an effective linear distance signal irrespective of the relative magnitudes of the tangential deviation signal and arc length signal.

18. The apparatus of claim 17 wherein the means for producing intermediate location signals further comprises:
  a. means for producing a programmed distance signal representing the larger of the linear distance between two successive programmed locations of the tool centerpoint and the arc length represented by the arc distance signal;
  b. means for producing coordinate component ratio signals representing the quotient of the change in magnitude of the coordinate component and the programmed distance signal;
  c. means responsive to the increment velocity signal and an iteration interval signal representing the period between iterations for producing an incremental distance signal representing an increment of motion occurring over the iteration period; and
  d. means responsive to the incremental distance signal and the coordinate component ratios for producing coordinate component signals representing coordinate components of the incremental distance.

19. The apparatus of claim 18 wherein the axis of rotation of the workpiece is not parallel to any of the coordinate axes defining programmed locations and the apparatus further comprises means for producing transformed coordinate signals representing coordinates of programmed locations relative to a rectangular coordinate system having its origin in the plane of the positioner to which the workpiece is mounted and having one axis substantially coincident with the axis of rotation of the workpiece.

20. The apparatus of claim 19 wherein the means for modifying the incremental velocity signals further comprises:
  a. means responsive to the transformed coordinate signals for producing an intermediate radial distance signal representing the radial distance from the axis of rotation of the workpiece to the intermediate tool centerpoint location; and
  b. means responsive to the intermediate radial distance signal, the increment velocity signal and the starting location radial distance signal for producing a modified increment velocity signal.

21. Apparatus for selectively, cooperatively controlling motion of a tool centerpoint associated with a function element carried by a manipulator and rotation of a workpiece carried by a positioner, the motion effected by the manipulator being along a linear path intersecting the axis of rotation of the workpiece, the motion being defined by input signals representing starting and ending locations of the tool centerpoint relative to a rectangular coordinate system associated with the manipulator and the starting and ending angular coordinates of the workpiece relative to the axis of rotation thereof, the manipulator and positioner having movable members driven by actuators controlled by servomechanism circuits, the relative motion of the tool centerpoint and workpiece surface being effected at a velocity represented by input signals, further input signals defining axial and radial limit distances relative to the axis of rotation of the workpiece, the apparatus comprising:
  a. means for storing input signals;
  b. means responsive to the input signals for producing a velocity coordination status signal representing the presence of a starting location within an envelope defined by the axial and radial limit distance signals;
  c. means responsive to the velocity coordination status signal for producing an adjusted velocity signal representing the velocity of the tool centerpoint resulting in a velocity thereof relative to the workpiece surface equal to the programmed velocity;
  d. means responsive to the location defining input signals and the adjusted velocity signals for iteratively producing incremental velocity signals, each incremental velocity signal representing the velocity of the tool centerpoint during an iteration interval;
  e. means for modifying the incremental velocity signals in proportions to the change in radial distance of the tool centerpoint from the axis of rotation of the workpiece between successive iterations;
  f. means responsive to the modified incremental velocity signals for producing intermediate location coordinate signals representing coordinates relative to a rectangular coordinate system associated with the manipulator of an intermediate location along the linear path of the tool centerpoint and an intermediate angular coordinate of the workpiece rotation relative to the axis of rotation thereof; and
  g. means for applying the intermediate coordinate signals to the servo mechanism circuits to effect coordinated motion of the movable members.

22. The apparatus of claim 21 wherein the means for producing the velocity coordination status signal further comprises:
  a. means responsive to the programmed location input signals for producing transformed programmed location coordinate signals representing coordinates of the tool centerpoint relative to a rectangular coordinate system having its origin in the plane of the positioner to which the workpiece is affixed and having an axis substantially coincident with the axis of rotation of the workpiece;
  b. means responsive to the transformed programmed location coordinate signals for producing a starting location radial distance signal representing the radial distance from the axis of rotation of the workpiece to a starting location of the tool centerpoint;
  c. means for comparing the transformed programmed location coordinate signals to the axial and radial limit distance input signals; and
  d. means responsive to the comparing means for producing a velocity coordination status signal in response to detecting the presence of the starting location within the envelope defined by the axial and radial limit distance signals.

23. The apparatus of claim 22 wherein the axis of rotation of the workpiece is not parallel to any of the coordinate axis defining programmed locations, and further input signals define rotations of the workpiece positioner coordinate system with respect to the manipulator rectangular coordinate system and the means for producing transformed coordinate signals further comprises:
 a. means for producing translational displacement signals representing the linear distance between the location defined by the manipulator coordinates and the origin of the positioner rectangular coordinate system; and
 b. means responsive to the translational displacement signals and the positioner coordinate system rotation input signals for producing the transformed coordinate signals.

24. An apparatus for cooperatively controlling motion of the tool centerpoint associated with the function element carried by a manipulator and rotation of a workpiece carried by a positioner, the motion effected by the manipulator being along a linear path intersecting the axis of rotation of the workpiece, the motion being defined by input signals representing starting and ending locations of the tool centerpoint motion and starting and ending orientations of the function element through the tool centerpoint and starting and ending angular positions of the workpiece, the manipulator and positioner having movable members driven by actuators controlled by servomechanisms circuits, the relative motion of the tool centerpoint and workpiece surface being effected at a velocity represented by input signals, the apparatus comprising:
 a. means for storing input signals;
 b. means responsive to the input signals for iteratively producing incremental velocity signals, each incremental velocity signal representing the velocity of the tool centerpoint during an iteration interval;
 c. means for modifying the incremental velocity signals in proportion to the change in radial distance of the tool centerpoint from the axis of rotation of the workpiece between successive iterations;
 d. means responsive to the modified incremental velocity signals for producing intermediate location coordinate signals representing coordinates relative to a rectangular coordinate system associated with the manipulator of an intermediate location along the linear path of the tool centerpoint and intermediate changes of orientation of the function element through the tool centerpoint and intermediate rotations of the workpiece; and
 e. means for applying the intermediate location, orientation and rotation coordinate signals to the servomechanism circuits to effect coordinated motion between the tool centerpoint and the workpiece.

25. The apparatus of claim 24 wherein the means for producing intermediate location signals further comprises:
 a. means for producing a program distance signal representing the largest of; the linear distance between two programmed locations; and the effective arc length swept by the function element between two programmed orientation; and the arc length swept by the average radial distance of the tool centerpoint from the axis of rotation of the workpiece through the programmed rotation of the workpiece;
 b. means for producing coordinate component ratio signals representing the quotient of the change in magnitude of the coordinate component and the programmed distance signal;
 c. means responsive to the increment velocity signal and an iteration interval signal representing the period between iterations for producing an incremental distance signal representing an increment of motion occurring over the iteration period; and
 d. means responsive to the incremental distance signal and the coordinate component ratios for producing coordinate component signals representing coordinate components of the incremental distance.

26. The apparatus of claim 25 wherein the axis of rotation of the workpiece is not parallel to any of the coordinate axes defining programmed locations of the tool centerpoint relative to the manipulator and the apparatus further comprises means for producing transformed coordinate signals representing coordinates of programmed locations relative to a rectangular coordinate system associated with the workpiece positioner having its origin in the plane of the positioner to which the workpiece is mounted and having an axis coincident with the axis of rotation of the workpiece.

27. The apparatus of claim 26 wherein the means for modifying the incremental velocity signals further comprises:
 a. means responsive to the transformed coordinate signals for producing an intermediate radial distance signal representing the radial distance from the axis of rotation of the workpiece to the intermediate tool centerpoint location; and
 b. means responsive to the intermediate radial distance signal, the incremental velocity signal, and the starting location radial distance signal for producing a modified increment velocity signal.

* * * * *